United States Patent
Yeh et al.

(10) Patent No.: US 6,549,646 B1
(45) Date of Patent: Apr. 15, 2003

(54) DIVIDE-AND-CONQUER METHOD AND SYSTEM FOR THE DETECTION OF LUNG NODULE IN RADIOLOGICAL IMAGES

(75) Inventors: Hwa-Young Michael Yeh, Potomac, MD (US); Jyh-Shyan Lin, Potomac, MD (US); Yuan-Ming Fleming Lure, Potomac, MD (US); Xin-Wei Xu, Gaithersburg, MD (US); Ruiping Li, Rockville, MD (US); Rong Feng Zhuang, Hyattsville, MD (US)

(73) Assignee: Deus Technologies, LLC, Rockville, MD (US)

( * ) Notice: Subject to any disclaimer, the term of this patent is extended or adjusted under 35 U.S.C. 154(b) by 0 days.

(21) Appl. No.: 09/503,840

(22) Filed: Feb. 15, 2000

(51) Int. Cl.$^7$ ................................................. G06K 9/00
(52) U.S. Cl. ....................... 382/132; 382/157; 382/199; 382/203; 382/205; 382/257; 382/274
(58) Field of Search ............................... 382/130, 132, 382/156, 172, 203, 224, 157, 199, 257, 274, 204, 205; 128/922, 925

(56) References Cited

U.S. PATENT DOCUMENTS

| | | | |
|---|---|---|---|
| 4,907,156 A | | 3/1990 | Doi et al. |
| 5,463,548 A | | 10/1995 | Asada et al. |
| 5,638,458 A | * | 6/1997 | Giger et al. ................. 382/132 |
| 6,335,980 B1 | * | 1/2002 | Armato et al. ............... 382/132 |

OTHER PUBLICATIONS

Y.S.P. Chiou, Y.M.F. Lure, Hybrid Lung Nodule Detection (HLLND) system, *Cancer Letter* 77(1994), pp. 119–126.

McNitt–Gray et al., Feature Selection in the Pattern Classification Problem of Digital Chest Radiograph Segmentation, *Transaction on Medical Imaging*, vol. 14, No. 3 (9/95), pp. 537–547.

Duryea et al., A fully automated algorithm for the segmentation of lung fields on digital chest radiographic images, *Med. Phys vol. 22* No. 2 (2/95) pp 183–191.

Armato, III et al., Computerized detection of abnormal asymmetry in digital chest radiographs$^{a)}$, *Med. Phys. 21 vol. 21, No. 11*, Nov. 1994, pp. 1761–1768.

Maria J. Carreira et al., Automatic Segmentation of Lung Fields on Chest Radiographic Images, *Computers and Biomedical Research 32*, (1999) pp. 283–303.

Neal F. Vittitoe et al. Identification of lung regions in chest radiographs using Markov random field modeling., *Med. Phys., vol. 25, No. 6* (6/98), pp. 976–985.

Akira Hasegawa et al., A Shift–Invariant Neural Network for the Lung Field Segmentation in Chest Radiography, *Journal of VLSI Signal Processing 18* (1998) pp. 241–250.

Osamu Tsujii et al., Automated segmentation of anatomic regions in chest radiographs using an adaptive–sized hybrid neural network, *Med. Phys., vol. 25, No. 6* (Jun. 1998), pp. 998–1007.

(List continued on next page.)

*Primary Examiner*—Jon Chang
*Assistant Examiner*—Charles Kim
(74) *Attorney, Agent, or Firm*—Venable, LLP; Jeffrey W. Gluck; Robert Kinberg

(57) ABSTRACT

A divide-and-conquer (DAC) method and system improve the detection of abnormalities, like lung nodules, in radiological images via the use of zone-based digital image processing and artificial neural networks. The DAC method and system divide the lung zone into different zones in order to enhance the efficiency in detection. Different image enhancement techniques are used for each different zone to enhance nodule images, as are different zone-specific techniques for selecting suspected abnormalities, extracting image features corresponding to selected abnormalities, and classifying the abnormalities as either true or false abnormalities.

102 Claims, 11 Drawing Sheets

OTHER PUBLICATIONS

Jyh–Shyan Lin et al., Reduction of False Positives in Lung Nodule Detection Using a Two–Level Neural Classification, *IEEE Transactions on Medical Imaging. vol. 15, No. 2* (Apr. 1996), pp. 206–217.

Shih–Chung B. Lo, Automatic Lung Nodule Detection Using Profile Matching and Back–Proopagation Neural Network Techniques, *Journal of Digital Imaging, vol. 6, No. 1* (Feb. 1993). pp. 48–54.

Shih–Chung B. Lo et al., Artificial Convolution Neural Network Techniques and Applications for Lung Nodule Detection, *IEEE Transaction on Medical Imaging. vol. 14, No. 4* Dec. 1995, pp. 711–718.

Maryellen Lissak Giger, Computerized Scheme for the Detection of Pulmonary Nodules, *Image Processing VI*, 1989.

Yun–Shu P. Chiou et al., Application of Neural Network Based Hybrid System for Lung Nodule Detection, *Proceeding of Sixth Annual IEEE Computer–Based Medical Systems Symposium*, Jun. 13, 1993.

Yulei Jiang et al., A Receiver Operating Characteristic Partial Area Index for Highly Sensitive Diagnostic Tests, *Radiology vol. 201, No. 3*, Dec. 1996, pp. 745–750.

Jyh–Shyan Lin et al. Differentiation Between Nodules and End–On Vessels Using A Convolution Neural Network Architecture, *Journal of Digital Imaging, vol. 8, No. 3* (Aug. 1995); pp. 132–141.

Ewa Pietka, Lung Segmentation in Digital Radiographs, *Journal of Digital Imaging, vol. 7, No. 2* (May 1994): pp. 79–84.

Jyh–Shyan Lin et al., A Hybrid Neural Digital computer–Aided Diagnosis System for Lung Nodule Detection on Digitized Chest Radiographs, *IEEE* (1994) pp. 207–212.

Shih–Chung B. Lo., Computer–Assisted Diagnosis of Lung Nodule Detection Using Artificial Convolution Neural Network, *SPIE, vol. 1898 Image Processing* (1993), pp. 859–869.

Anil K. Jain, *Fundamentals of Digital Image Processing*. Englewood Cliffs, NJ: Prentice–Hall, Inc., 1989, pp. 246–247, 252–253, 380–381, 384–387.

William K. Pratt, *Digital Image Processing*. New York: John Wiley & Sons, Inc., 1991, pp. 472–476, 613–614, 632–636.

Simon Haykin, *Neural Networks: A Comprehensive Foundation*. New York: Macmillan College Publishing Co., Inc., 1994, pp. 179–181, 408–412.

* cited by examiner

DIVIDE-AND-CONQUER METHOD AND SYSTEM FOR THE DETECTION OF LUNG NODULE IN RADIOLOGICAL IMAGES

RELATED APPLICATIONS

This application relates to U.S. patent application Ser. No. 08/597,736, filed Feb. 6, 1996, entitled "Method and System for the Detection of Lung Nodule in Radiological Images Using Digital Image Processing and Artificial Neural Network," commonly assigned with this application, and whose disclosure is incorporated by reference in its entirety herein. It further relates to U.S. patent application Ser. No. 09/503,839, entitled, "Method and System for the Detection of Lung Nodule in Radiological Images Using Digital Image Processing and Artificial Neural Network," filed concurrently herewith and commonly assigned with this application, and whose disclosure is incorporated by reference in its entirety herein.

TECHNICAL FIELD

The present invention relates to an automated method and system for processing digital radiological images, and more specifically, to a Divide and Conquer (DAC) method and system for the detection of abnormalities, like lung nodules, in radiological chest images using zone-based digital image processing and artificial neural network techniques.

BACKGROUND OF THE INVENTION

Lung cancer, next to heart disease, is the second highest leading cause of death in the United States. Successful detection of early-stage cancer tumors is able to increase the cure rate. Detection and diagnosis of cancerous lung nodules in chest radiographs are among the most important and difficult tasks performed by radiologists. To date, diagnosis in x-ray chest radiographs is the most important diagnostic procedure for the detection of early-stage, clinically occult lung cancer. However, the radiographic miss rate for the detection of lung nodules is quite high. Observer error, which causes these lesions to be missed, may be due to the camouflaging effect of the surrounding anatomic background on the nodule of interest, or to the subjective and varying decision criteria used by radiologists. Under-reading of a radiograph may be due to many other reasons, such as lack of clinical data, focusing of attention on another abnormality by virtue of a specific clinical question, etc. However, most peripheral lung cancers are visible in retrospect on previous films. Thus, a need remains for an automated method and system for digital image processing of radiographic images to alert radiologists to the location of highly suspected abnormality areas (SAAs).

Early radiological detection of lung nodules can significantly improve the chance of survival of lung cancer patients. A system capable of locating the presence of nodules commonly obscured by overlying ribs, bronchi, blood vessels, and other normal anatomic structures on radiographs would greatly improve the detection process. The automated system and method of the present invention allow the reduction of false negative diagnoses, and hence lead to earlier detection of lung cancers with high accuracy.

PRIOR ART

Several computer-aided diagnosis or detection (CAD) techniques using digital image processing and artificial neural networks have been described in the open literature and in patents. Of particular relevance to the present invention are the following:

Michael F. McNitt-Gray, H. K. Huang, and James W. Sayre, "Feature Selection in the Pattern Classification Problem of Digital Chest Radiograph Segmentation", *IEEE Transactions on Medical Imaging*, Vol. 14, No. 3, September 1995, describes a method for the segmentation of digital chest radiographs using feature selection in different anatomic class definitions. McNitt-Gray et al. apply stepwise discriminant analysis and neural network techniques to segment the chest image into five anatomic zones. The five anatomic classes are: (1) heart/subdiaphram/upper mediastinum; (2) lung; (3) axilla (shoulder); (4) base of head/neck; and (5) background (area outside the patient but within the radiation field). This method was developed for use in exposure equalization. Note that the segmentation method of McNitt-Gray et al. is based on well-known knowledge of the anatomic structure of the lung region. Additionally, the zone boundaries in the McNitt-Gray et al. paper are crisply delineated and do not overlap.

Ewa Pietka, "Lung Segmentation in Digital Radiographs", *Journal of Digital Imaging*, Vol. 7, No. 2 (May), 1994, uses a three-step algorithm involving histogram-dependent thresholding, gradient analysis, and smoothing to identify lung and non-lung regions. The method is developed for use in exposure equalization.

Jeff Duryea and John M. Boone, "A fully automated algorithm for the segmentation of lung zones on Digital Chest Radiographic Images", *Medical Physics*, 22 (2), February, 1995, describes a multi-step edge-tracing algorithm to find the lung/non-lung borders and hence to identify the lung and non-lung regions. The method is not developed for CAD purposes. The method is developed for use in exposure equalization.

Samuel G. Armato III, Maryellen L. Giger, and Heber MacMahon, "Computerized Detection of Abnormal Asymmetry in Digital Chest Radiographs", *Medical Physics*, 21 (2), November, 1994, describes an algorithm to detect abnormal asymmetry in digital chest radiographs using multi-stage gray-level thresholding. The purpose is to identify the left and right lungs and to detect large-scale abnormalities, like the asymmetry of the two lungs. The method is not developed for CAD of lung nodules.

Maria J. Carreira, Diego Cabello, and Antonio Mosquera, "Automatic Segmentation of Lung zones on Chest Radiographic Images", *Computers and Biomedical Research* 32, 1999, describes a method for automatic segmentation of lung zones in chest radiographic images. The purpose of the method is to use the lung zones as a first estimate of the area to search for lung nodules.

Neal F. Vittitoe, Rene Vargas-Voracek and Carey E. Floyd, Jr, "Identification of Lung regions in Chest Radiographs Using Markov Random Field Modeling", *Medical Physics*, 25 (6), June, 1998, presents an algorithm utilizing Markov Random Field modeling for identifying lung regions in a digitized chest radiograph. The purpose of the algorithm is to identify lung zone so that specific computer-aided diagnosis algorithms can be used to detect lung abnormalities including interstitial lung disease, lung nodules, and cardiomegaly. Note that the CAD method of Vittitoe et al. is limited to the identified lung zone and ignores the obscured lung regions, such as mediastinum, cardiac, and subdiaphragmatic areas.

Akira Hasegawa, Shih-Chung B. Lo, Jyh-Shyan Lin, Matthew T. Freedman, and Seong K. Mun, "A Shift-Invariant Neural Network for the Lung Field Segmentation in Chest Radiography", *Journal of VLSI Signal Processing* 18, 1998, describes a method of using a shift-invariant neural network to segment the chest image into lung and non-lung zones. A set of algorithms is used to refine the detected edge of the lung field. Hasegawa et al. do not further segment the lung zone into different zones. Though mentioning the potential usage of their result for the CAD applications, they discard all the pixels in the obscured areas in the lung zone. The paper suggests that CAD be applied to the non-obscured areas of the lung, while the obscured areas, such as heart, spine, and diaphragm, are excluded.

Osamu Tsujii, Matthew T. Freedman, and Seong K. Mun, "Automated Segmentation of Anatomic Regions in Chest Radiographs Using an Adaptive-sized Hybrid Neural Network", *Medical Physics*, 25 (6), June 1998 (the article also appears in SPIE, *Image Processing*, Vol. 3034, 1997), describes a method of using image features to train an adaptive-sized hybrid neural network to segment the chest image into lung and non-lung zones.

U.S. Pat. No. 4,907,156 to Doi et al. describes a method for detecting and displaying abnormal anatomic regions existing in a digital X-ray image. A single projection digital X-ray image is processed to obtain signal-enhanced image data with a maximum signal-to-noise ratio (SNR) and is also processed to obtain signal-suppressed image data with a suppressed SNR. Then, difference image data are formed by subtraction of the signal-suppressed image data from the signal-enhanced image data to remove low-frequency structured anatomic background, which is basically the same in both the signal-suppressed and signal-enhanced image data. Once the structured background is removed, feature extraction is performed. For the detection of lung nodules, pixel thresholding is performed, followed by circularity and/or size testing of contiguous pixels surviving thresholding. Threshold levels are varied, and the effect of varying the threshold on circularity and size is used to detect nodules. Pixel thresholding and contiguous pixel area thresholding are performed for the detection of lung nodules. Clusters of suspected abnormality areas are then detected.

J. S. Lin, S. C. Lo, A. Hasegawa, M. T. Freedman, and S. K. Mun, "Reduction of False Positives in Lung Nodule Detection Using a Two-Level Neural Network Classification", *IEEE Transactions on Medical Imaging*, Vol. 15, No. 2, April 1996, describes classification of nodules and false positives using a two-level convolution neural network consisting of a two-dimensional connection trained with a back-propagation learning algorithm. The two-level convolution neural network is trained based on all the candidates of the whole lung zone. Lin et al. focus on the classification of nodules and false positives (i.e., on reducing the number of false positives). Lin et al., without mentioning the segmenting of lung zone of the chest image, apply the search techniques to the entire chest image to identify suspected abnormality areas, for example, an area containing a nodule. The nodules and false positives initially detected in the whole lung are used to train the two-level convolution neural network. S. C. Lo, M. T. Freedman, J. S. Lin, and S. K. Mun, "Automatic Lung Nodule Detection Using Profile Matching and Back-Propagation Neural Network Techniques", *Journal of Digital Imaging*, Vol. 6, No. 1, 1993. This article describes nodule detection methods using a fully connected neural network trained with a back-propagation learning algorithm and a two-dimensional sphere profile matching technique. Lo et al., without mentioning the segmenting of lung zone of the chest image, apply the techniques to the entire chest image to identify suspected abnormality areas. The approach used in Lo et al. article does not segment the lung zone in the chest image. The search and classification of false positives are not limited to the lung zone but are applied to the whole chest image.

J.-S. Lin, P. Ligomenides, S.-C. B. Lo, M. T. Freedman, S. K. Mun, "A Hybrid Neural-Digital Computer Aided Diagnosis System for Lung Nodule Detection on Digitized Chest Radiographs", *Proc.* 1994 *IEEE Seventh Symposium on Computer Based Medical Systems*, pp. 207–212, describes a system for the detection and classification of cancerous lung nodules utilizing image processing and neural network techniques.

S. C. B. LO, S. L. A. Lou, J. S. Lin, M. T. Freedman, M. V. Chien, and S. K. Mun, "Artificial Convolution Neural Network Techniques and Applications for Lung Nodule Detection", *IEEE Transactions on Medical Imaging*, 1995, Vol. 14, No. 4, pp 711–718, describes a system for detection and classification of lung nodules using a convolution neural network. M. L. Giger, "Computerized Scheme for the Detection of Pulmonary Nodules", *Image Processing VI, IEEE Engineering in Medicine & Biology Society*, 11th *Annual International Conference* (1989), describes a computerized method to detect locations of lung nodules in digital chest images. The method is based on a difference-image approach and on various feature-extraction techniques, including a growth test, a slope test, and a profile test. The aim of the detection scheme is to direct the radiologist's attention to locations in an image that may contain a pulmonary nodule, in order to improve the detection performance of the radiologist.

U.S. Pat. No. 5,463,548 to Asada et al. describes a system for computer-aided differential diagnosis of diseases and, in particular, computer-aided differential diagnosis using neural networks. A first design of the neural network distinguishes between a plurality of interstitial lung diseases on the basis of inputted clinical parameters and radiographic information. A second design distinguishes between malignant and benign mammographic cases based upon similar inputted clinical and radiographic information. The neural networks were first trained using a hypothetical database made up of hypothetical cases for each of the interstitial lung diseases and for malignant and benign cases. The performance of the neural network was evaluated using receiver operating characteristics (ROC) analysis. The decision performance of the neural network was compared to experienced radiologists and achieved a high performance comparable to that of the experienced radiologists. Asada's method appears to be limited to the detection of lung diseases exclusive of lung cancer, which present different symptoms. Asada's method also does not use a zone-based approach.

Y. S. P. Chiou, Y. M. F. Lure, and P. A. Ligomenides, "Neural Network Image Analysis and Classification in Hybrid Lung Nodule Detection (HLND) System", *Neural Networks for Processing III Proceedings of the* 1993 *IEEE-SP Workshop*, pp. 517–526. The Chiou et al. article describes a Hybrid Lung Nodule Detection (HLND) system based on artificial neural network architectures, which is developed for improving diagnostic accuracy and speed of lung cancerous pulmonary radiology. The configuration of the HLND system includes the following processing phases: (1) pre-processing to enhance the figure-background contrast; (2) quick selection of nodule suspects based upon the most pertinent feature of nodules; and (3) complete feature space determination and neural classification of nodules. Chiou et al. classifies suspected nodule areas into different anatomic structures, including rib crossing, rib-vessel crossing, end vessel, vessel cluster, rib edge, vessel, and bone (causing false positive detection). These structures, as well as a true nodule, are used as training classes to develop a neural network classifier. Note that the Chiou et al. method does not include segmentation of the lung zone into different zones or the use of that segmentation in the analytical/diagnostic processes.

SUMMARY OF THE INVENTION

The present invention for detection of abnormalities, like lung nodules, in a radiological chest image overcomes the foregoing and other problems associated with the prior art by applying a divide-and-conquer approach. Based on the knowledge of rib cage (i.e., boundary of the lung zone), the present invention divides the lung zone into different zones of similar image characteristics (of both nodule and normal anatomic structure) and conquers the problems of reducing the false positives and increasing the true positives by utilizing different digital image processing techniques and training different neural network classifiers based on the image characteristics of each zone. The lung zone is segmented into different zones, such as spine, clavicle, mediastinum, peripheral lung edge, peripheral lung central, and heart zones. For each zone, different image processing techniques are applied to enhance object-to-background contrast and to select suspected abnormality areas (SAAs). Furthermore, the present invention uses feature extraction and neural networks developed and trained specifically for each zone to finally classify the SAAs to maximize the detection of true nodules within radiological image. The findings of the potential SAAs in each zone are clustered together and used to train neural network classifiers. To avoid potential boundary problems, the zones may overlap each other. The invention develops zone-specific feature extraction algorithms for each of the zones to extract image features of the SAAs located in each particular zone. The invention trains each zone-specific classifier(s) using the SAA of that zone. Different zone-specific classifiers are trained to have different sensitivities and specificities on each zone. The invention uses SUB-$A_z$ (read "SUB-A-SUB-Z") to validate different classifier performance. Some classifiers will have very high specificity (i.e., very low false-positive rate) with relative low sensitivity, while some will have very high sensitivity performance.

The present invention can be implemented in a parallel processing environment. Each zone can be processed independently of each other zone. The final output of the system is produced by a data fusion unit that optimally combines the outputs from different classifiers based on each classifier's sensitivity and specificity performance.

An embodiment of the invention includes a system containing parallel processors that process different zones in parallel and a data fusion unit that combines the output from different classifiers. The different classifiers are trained using SAAs of the individual zones.

BRIEF DESCRIPTION OF THE DRAWINGS

For a more thorough understanding of the present invention and the advantages thereof, reference is now made to the following description taken in conjunction with the accompanying drawings, in which.

DETAILED DESCRIPTION OF THE PREFERRED EMBODIMENTS

Figure 1:
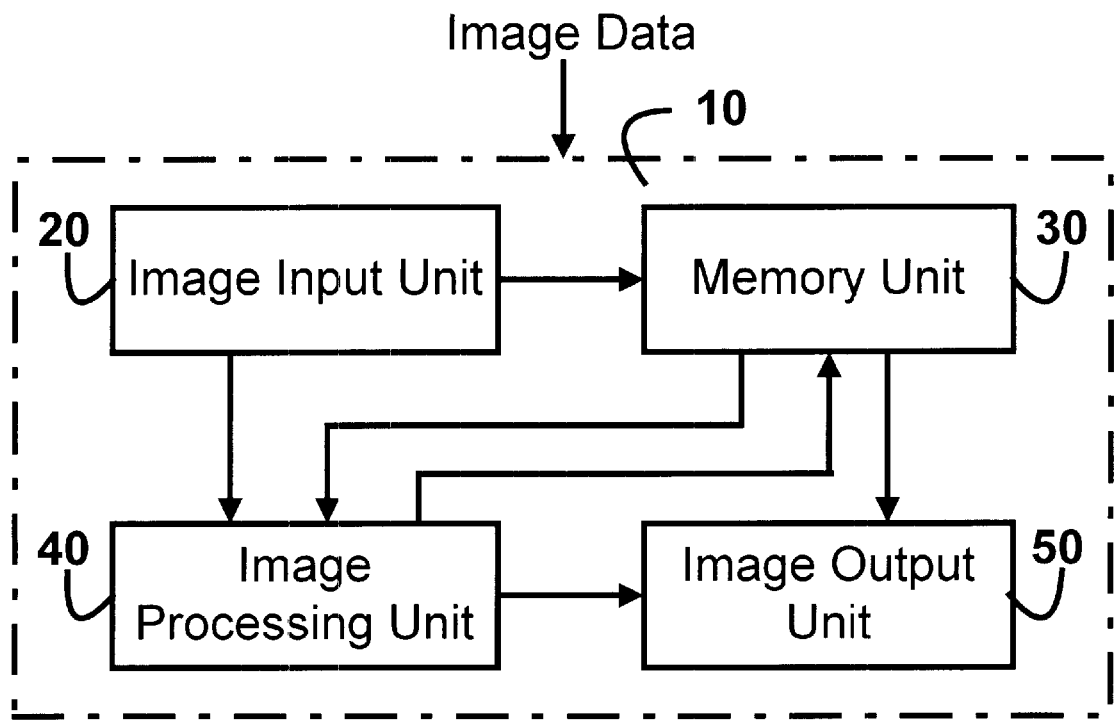
FIG. 1 illustrates a system for implementing a method according to an embodiment of the present invention.

Referring to FIG. 1, a schematic block diagram illustrating a system for implementing the automated method and system according to an embodiment of the present invention, image data of the anatomic region of interest (e.g., a chest) is entered into the image input unit 20. For example, a video camera, computer radiography (CR) system, digital radiography (DR) system, or a film digitizer may provide such data. The data in the image input unit 20 is stored for later retrieval and use in the memory unit 30 or sent to image processing unit 40. Any suitable memory unit device, such as magnetic tape, computer disk, magnetic-optic (MO) disk, optical laser storage, or the like, can be utilized. In the image processing unit 40, the method of the present invention is applied to an image to detect lung nodules within the image. The image processing unit 40 consists of three stages that correspond to the three main steps of the method of the present invention. Subsequently, the image is sent to the memory unit 30 for storage and/or an image display unit 50, such as a monitor, a printer, a plotter, a chart recorder, or the like.

Figure 2:
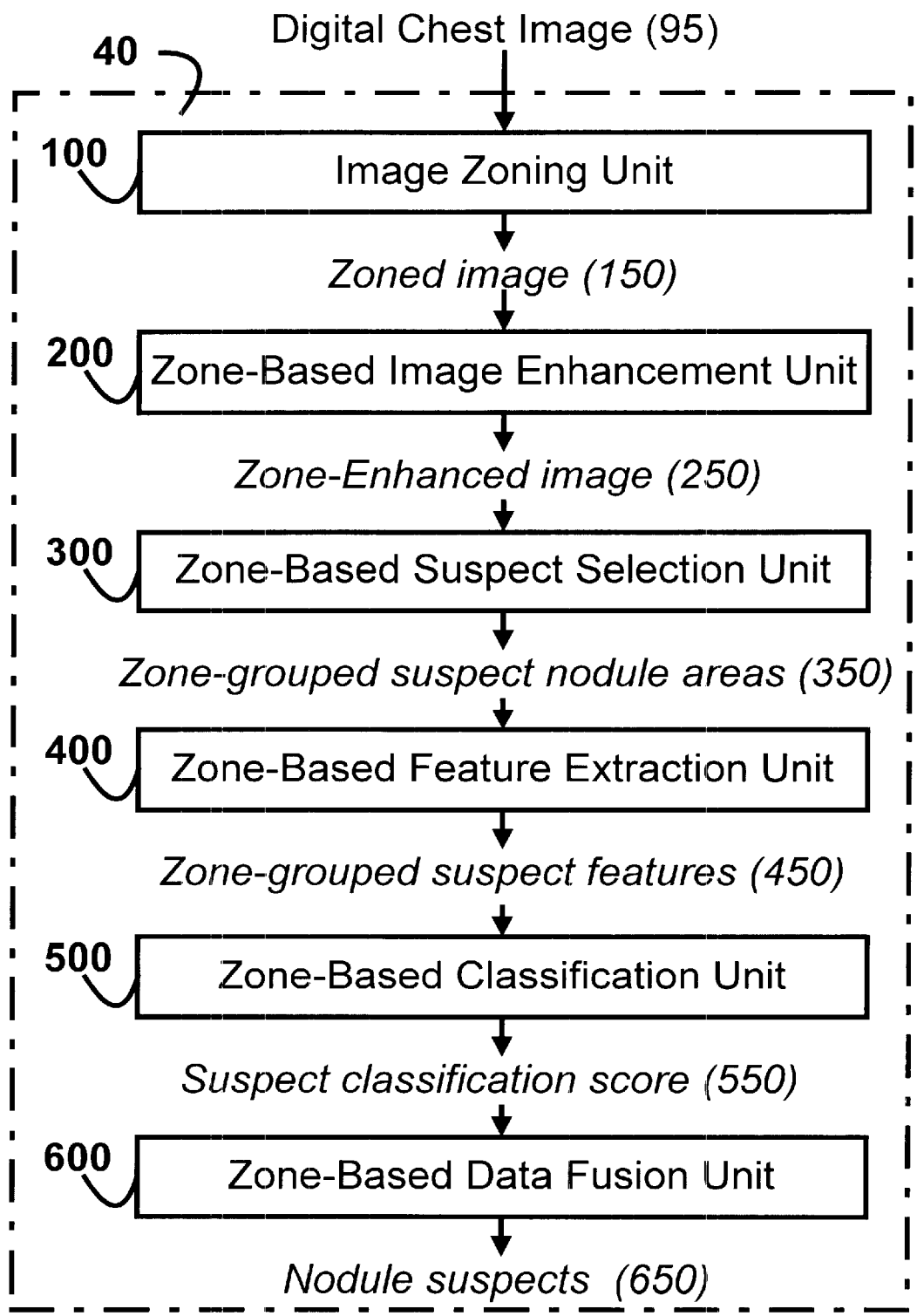
FIG. 2 is a schematic diagram of a method according to an embodiment of the present invention.

FIG. 2 illustrates a schematic diagram of the automated method and system of image processing unit 40 of the present invention. Once image data is acquired from a radiological chest image, the data is subject to an image zoning process 100 followed by multiple stages (200, 300, 400, 500) of zone-based image processing and classification methods to identify suspected abnormality areas. The automated method and system of the present invention include five phases or stages.

In the first stage, an image zoning unit 100, digital chest image 95 is processed by the image zoning unit 100 to generate the zoned image 150. The digital chest image 95 is divided into non-lung and lung zones in the zoned image 150. The pixels in the non-lung zone of the zoned image 150 are discarded and thus not used for further processing. The lung zone in the zoned image 150 is divided into multiple overlapped zones, such as peripheral edge, diaphragm, clavicle bone, diaphragm, hilum, and peripheral central zones.

In the second stage, a zone-based image enhancement unit 200 utilizes different image enhancement techniques on different zones to generate zone-enhanced image 250, thereby enhancing potential nodule information in zoned image 150.

In the third stage, in zone-based suspected abnormality areas selection unit 300, contour search and sphere profile matching procedures are performed on each individual zone of the zone-enhanced image 250 to extract image blocks (e.g., 64×64 pixels) of zone-grouped suspected abnormality areas 350 from the digital chest image 95. Each image block corresponds to a suspected abnormality area at each location on the zone-enhanced image 250.

In the fourth stage, in zone-based feature extraction unit 400, different feature extraction algorithms are developed for each zone and are employed to extract image features of the zone-grouped suspected abnormality areas 350. Different feature extraction algorithms are specifically developed by using the zone-grouped suspect nodule areas 350 in each zone to generate zone-grouped suspect features 450 for each suspected abnormality area.

In the fifth stage, in zone-based classification unit 500, different classifiers are developed for each zone and employed to classify zone-grouped suspect features 450. Different classifiers are specifically trained by the zone-grouped suspect features 450 in each zone to generate suspect a classification score 550 for each suspected abnormality area. Each classifier is trained and cross validated by using the SUB-$A_z$ (read as "SUB-A-SUB-Z") method to train a classifier to have high specificity performance.

In the final stage, in zone-based data fusion unit 600, the suspect classification scores 550 associated with each suspected abnormality area from different zones are fused to provide the final suspected abnormality areas 650.

A more detailed description of each processing unit will follow.

Image Zoning Unit (100)

Figure 3:
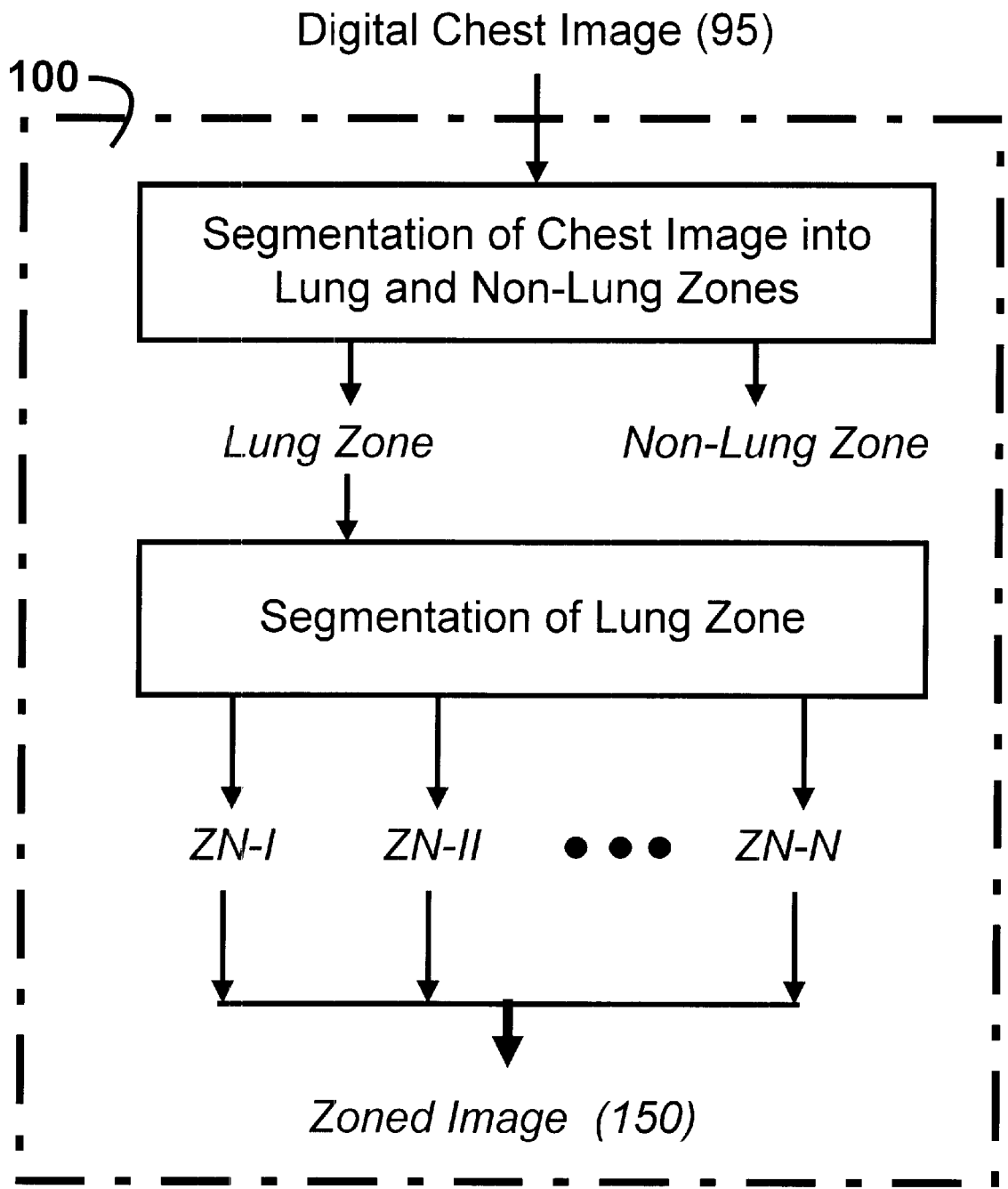
FIG. 3 is a schematic diagram of an image zoning unit according to an embodiment of the present invention.

FIG. 3 depicts an embodiment of the image zoning unit 100 of the image processing unit 40 illustrated in FIG. 2. In FIG. 3, ZN-x represents zone x, where x is I, II, III, IV, V, or VI.

The zoning process has three major steps: (1) identification of lung zone, (2) identification of non-obscured lung zone, and (3) segmentation of the non-obscured lung zone. The preferred embodiment employs a method proposed by A. Hasegawa, et al. ("A Shift-Invariant Neural Network for the Lung Field Segmentation in Chest Radiography", 1998) to directly identify the non-obscured and obscured lung zones (i.e., steps (1) and (2)). The non-obscured lung zone is divided into different zones according to geometry distributions and subtleties of abnormalities, such as nodules.

More than 500 images containing nodules (i.e., true positives) of different subtleties and image characteristics in chest images are used to determine the zones. The subtlety of a specific nodule is evaluated and determined. The following have been determined through analyses:

(a) Abnormalities located in the areas of the mediastinum, spine, and heart are mostly subtle since they are obscured by the heart and spine.

(b) Abnormalities, like pancoast cancer, located in the areas of clavicle are subtle because they overlap with the clavicle bone.

(c) Abnormalities close to the ribcage boundary are subtle due to low contrast and the presence of the ribcage boundary.

(d) Abnormalities like nodules that are small (for example, smaller than 10 mm in diameter) and with low contrast are subtle.

(e) Abnormalities like nodules that are large (for example, 30 mm in diameter) and high contrast nodules are obvious.

(f) Abnormalities overlapping with the bronchi and large vessels are subtle.

(g) Abnormalities partially overlapping the diaphragm (i.e., located at the diaphragm edge) are subtle.

In addition to the analysis of the subtlety of the abnormality, image characteristics of normal anatomic structures (i.e., false positives) are analyzed. The following observations have been made:

(a) The spinal cord is the major normal structure in the spine area, and vessels are the major normal structures in the heart area.

(b) The clavicles, rib-clavicle crossings, and rib crossing, are the major normal structures in the areas close to the clavicles.

(c) Rib and rib crossing are the major lung structures close to the ribcage.

(d) End-on vessels and bronchi are major lung structures close to the hilum.

(e) There is little normal lung structure in the vicinity of and along the diaphragm.

Figure 3A:
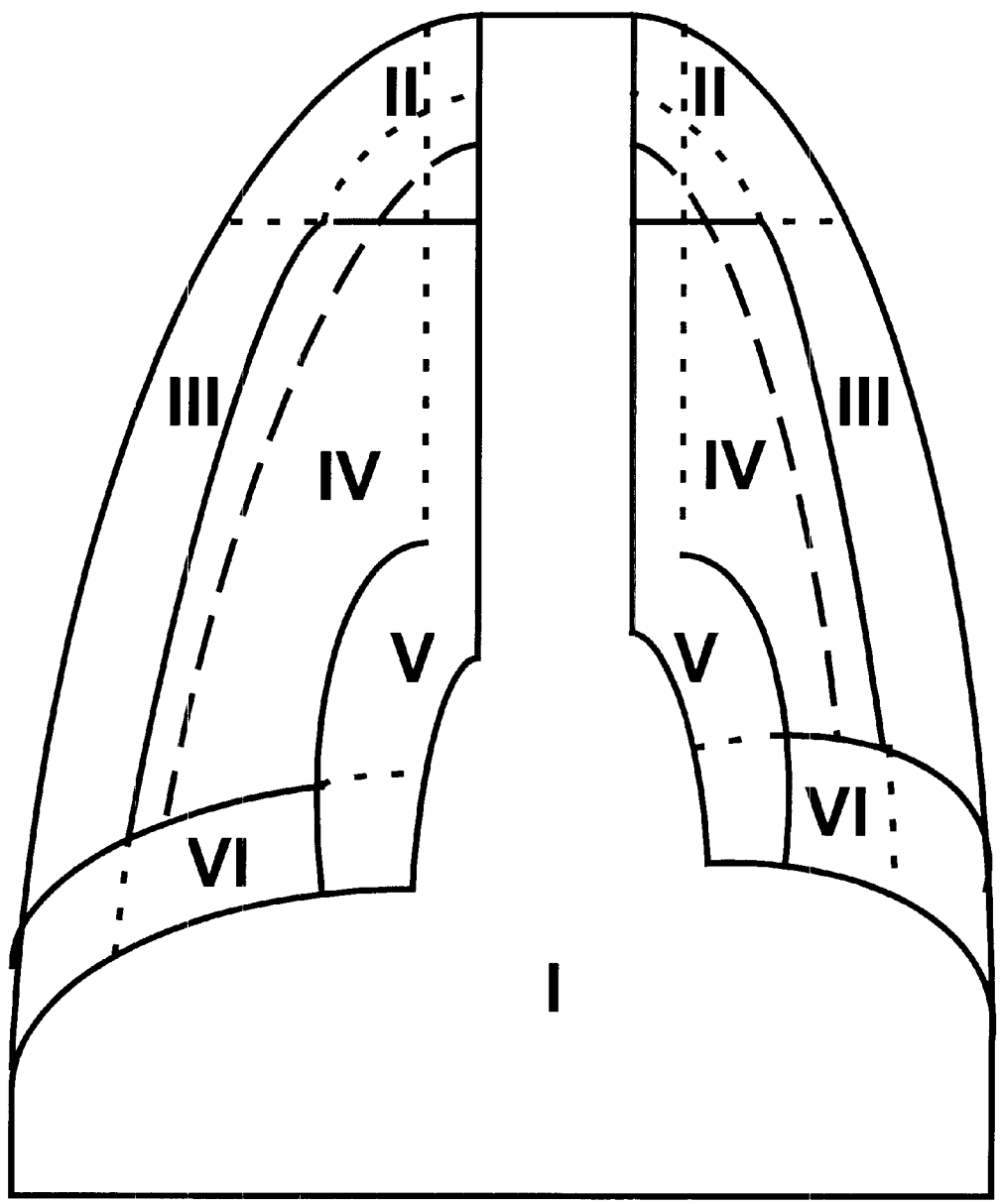

By analyzing the distribution of the subtlety, locations, and normal anatomic lung structures, the lung zone can be divided into six zones: (a) zone I—obscured lung zone, (b) zone II—clavicle zone, (c) zone III—peripheral edge zone, (d) zone IV—peripheral central, (e) zone V—hilum zone, and (f) zone VI—diaphragm zone. Note that these definitions for the zones are different from those published, for example, in Michael F. McNitt-Gray et. al., "Feature Selection in the Pattern Classification Problem of Digital Chest Radiograph Segmentation", *IEEE Transactions on Medical Imaging*, Vol. 14, No. 3, September 1995). Moreover, the different zones of the present invention are permitted to overlap with each other. FIG. 3A shows an example of the zoning mask with six zones (I, II, III, IV, V, and VI); each zone is assigned a unique constant gray value. For example, one may use zone I is 100, zone 11 is 200, zone III is 300, zone IV is 400, zone V is 500, and zone VI is 600. The dotted lines indicate the overlapped regions of different zone boundaries. The methods used to locate the zones are described as follows:

1. The obscured lung zone (zone I) is the area covering the spine, heart, and medastinum. To identify the obscured lung zone (i.e., the areas of the spine, heart, and mediastinum), the non-obscured lung zone in the chest image is first extracted using the method proposed by Hasegawa et. al. ("A Shift-Invariant Neural Network for the Lung Field Segmentation in Chest Radiography", 1998). More than 100 images are used in a back-propagation training method to train a shift-invariant neural network. Following a boundary smoothing method described in the paper, the non-obscured lung zone is identified. The obscured lung zone is obtained by excluding the non-obscured lung zone from the lung zone. In the zoning mask image, all the pixels in the non-obscured left lung zone are set to 32, all pixels in the non-obscured right lung zone are set to 64, and all pixels in the obscured lung zone are set to 100.

2. The clavicle zone (zone II) is the area close to the clavicle or shoulder bone. The clavicle zone is obtained by first locating the locations of the top of the non-obscured left and right lung zones. This can be done by searching vertically for the first pixel that has value of 32 (64) of the left (right) non-obscured lung zone in the mask image. The clavicle zone is the area from the top of the non-obscured left (right) lung extended one fifth of the number of pixels (i.e., one fifth of the distance in pixels between bottom of the lung and top of the lung) from the top of the lung toward the bottom of the left (right) lung. All the pixels located in the clavicle zone are set to 200.

3. The peripheral edge zone (zone III) is the area close to the ribcage. The peripheral edge zone is obtained by independently applying an erosion technique on the left and right non-obscured lung zones. Each (x, y) point location along the left and right sides of the ribcage is located by using a contour following algorithm (a contour following algorithm is used to trace the boundary of an area, where the edges have pixel values greater than a threshold value. Reference is made to Anil K. Jain, *Fundamentals of Digital Image Processing*, published by Prentice-Hall, Inc., 1989, page 358, which is incorporated herein by reference). Threshold values of 32 and 64 are used in the contour following algorithms for extracting the boundary locations of the left and right non-obscured lung zones, respectively. After the boundary locations of the left and right lung zones are determined, an image erosion method using a rectangular structure element to create the peripheral edge zone is applied. The width and height of such a rectangular structure element may be, for example, 100 and 1, respectively. The erosion is done by centering the rectangular structure element at each ribcage point and, for each pixel of the mask located inside the structure element, replacing the pixel value by the constant value of 300.

4. The peripheral central zone (zone IV) is the area between the peripheral edge zone and the hilum zone (to be described next). The peripheral central zone is obtained by applying an erosion technique similar to that used for creating Zone III. Two structure elements, one having a width of 360 pixels and the other having a width of 100 pixels, are used in a preferred embodiment. Both structure elements are one pixel in height in this embodiment. The erosion technique is applied twice on each of the left and right lungs using the two structure elements. On each lung, the two rectangular structure elements are centered at each ribcage point, and two eroded regions are thereby created. The overlapped area of the two eroded regions is defined as the peripheral central zone. All the pixels located inside the peripheral central zone are set to the constant value of 400.

5. The hilum zone (zone V) is the area close to the heart. The hilum zone is obtained by applying an erosion technique similar to that used for creating Zone IV except that the heights of the two structure elements (both one pixel in height) are different. One structure element has width of 560 pixels, while the other structure element has a width of 360 pixels. The erosion technique is applied twice using the two structure elements by centering the rectangular structure elements at each ribcage point, and two eroded regions are thereby created. The overlapped area of the two eroded regions is defined as the peripheral central zone. The hilum zone can also be obtained by applying the erosion technique along the heart boundary and spine. The structure element has width of 100 and height of 1 pixel. All the pixels located inside the hilum zone are set to the constant value of 500.

6. The diaphragm zone (zone VI) is the area (including obscured and non-obscured lung zone) along the diaphragm. The diaphragm zone is obtained by applying an erosion technique along the diaphragm locations at the bottom of the non-obscured lung zone. Image erosion methods are applied using a rectangular structure element to create the diaphragm zone. The structure element may have, for example, a width of 1 and a height of 180. The erosion is done by centering the rectangular structure element at each diaphragm point and, for each pixel of the mask located inside the structure element, replacing the pixel value by the constant value of 600.

Zone-Based Image Enhancement Unit (200)

Figure 4:
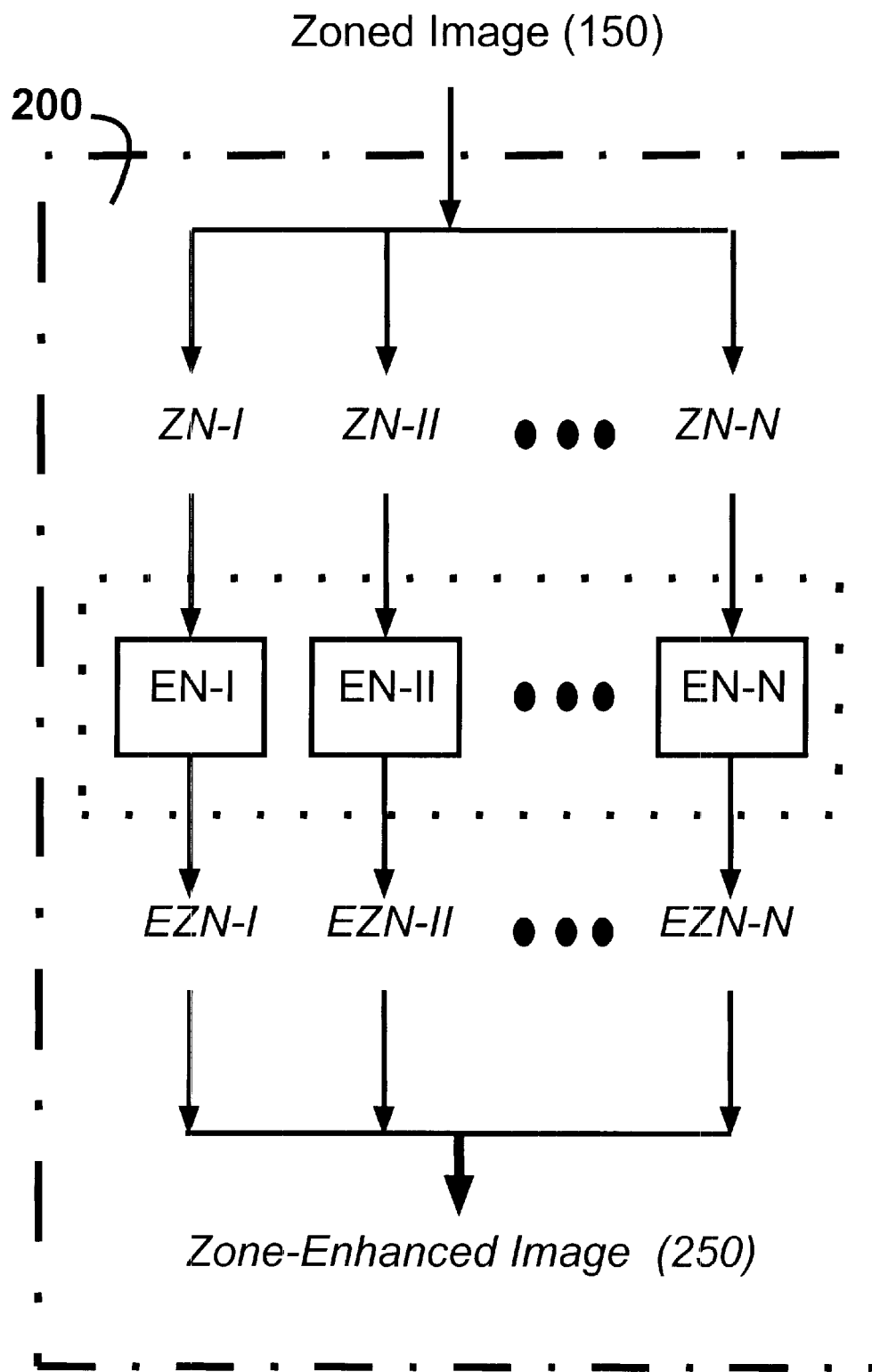
FIG. 4 is a schematic diagram of a zone-based image enhancement unit according to an embodiment of the present invention.

FIG. 4 depicts an embodiment of a zone-based image enhancement unit 200 of the image processing unit 40 illustrated in FIG. 2. In FIG. 4, ZN-x represents zone x, EN-x represents enhancement algorithm(s) used for zone x, EZN-x represents enhanced zone x, where x is I, II, III, IV, V, or VI.

Due to the complex nature of the lung anatomic structure, a single image enhancement or filtering technique may be effective (in enhancing nodule signals) in some areas of the lung zone but less effective in other areas of the lung zone. The division of lung zone into further zones allows the design and development of anatomic and abnormality specific methods for each zone based on each zone's abnormality's subtlety and zone characteristics. During the image enhancement stage, object-to-background contrast of each zone is enhanced by a different image enhancement method based on the local image characteristics and abnormality's subtlety of each zone. The use of zone-based anatomic specific image enhancement methods can potentially eliminate a high number of false positives experienced using prior art methods and can potentially increase the detection accuracy. The enhancement methods used for each zone are described as follows:

1. Zone I—A histogram equalization method is used to enhance the contrast in the obscured lung zone (i.e., zone I). The histogram of an image represents the relative frequency of occurrence of the various gray levels in the image. Low contrast areas, like the obscured lung zone, have narrow histograms. A histogram equalization method is used to obtain a uniform histogram of the obscured lung zone and hence to improve the contrast of the obscured lung zone. The histogram equalized obscured lung zone ($v^*$) can be obtained by the following steps:

(a) Compute the histogram $h(x_i)$, of the number of pixels with gray level value $x_i$ in the obscured lung zone, by counting the frequency of the occurrence of the pixels with gray level value $x_i$.

(b) Compute the probability $p_u(x_i)$ of the pixels with gray level value $x_i$.

$$p_u(x) = \frac{h(x)}{\sum_{i=0}^{L-1} h(x_i)},$$

$$i = 0, 1, \ldots, L-1$$

(c) The output image $v^*$, which has the same number of gray levels L, is computed as follows:

$$v^* = Int\left[\frac{(v - v_{\min})}{1 - v_{\min}}(L-1) + 0.5\right],$$

$$v = \sum_{x_i=0}^{u} P_u(x_i)$$

where Int represents the integer (truncation) function and $v_{min}$ is the smallest positive value of v.

2. Zone II—For the clavicle zone, the abnormality-to-background contrast is enhanced by removing the clavicle structure by the following steps:

(a) Enhancing the clavicle bone and rib by spatially convolving the peripheral lung edge zone with a Sobel row gradient edge operator. The Sobel row gradient edge operator is defined as $$\frac{1}{4}\begin{bmatrix} -1 & -2 & -1 \\ 0 & 0 & 0 \\ 1 & 2 & 1 \end{bmatrix}$$

Reference is made to Anil K. Jain, *Fundamentals of Digital Image Processing*, published by Prentice-Hall, Inc., 1989, pages 348–350, which is incorporated herein by reference.

(b) Using a Hough transform to detect and remove the clavicle bone and rib. The Hough transform is used to detect the straight lines in the enhanced clavicle bone and rib (by the Sobel row gradient edge operator) clavicle zone. The area of the detected straight line is replaced by the average pixel value of the neighborhood pixels along the straight line.

3. Zone III—The peripheral lung edge zone is enhanced by the following three steps:

(a) Enhancing the ribcage edge by spatially convolving the peripheral lung edge zone with a Sobel column gradient edge operator. The Sobel column gradient edge operator is defined as $$\frac{1}{4}\begin{bmatrix} 1 & 0 & -1 \\ 2 & 0 & -2 \\ 1 & 0 & -1 \end{bmatrix}$$

Reference is made to Anil K. Jain, *Fundamentals of Digital Image Processing*, published by Prentice-Hall, Inc., 1989, pages 348–350, which is incorporated herein by reference.

(b) Using a Hough transform to detect and remove the ribcage edge. The Hough transform is used to detect the straight lines in the enhanced ribcage edge (by the Sobel row gradient edge operator) peripheral lung edge zone. The area of the detected straight line is replaced by the average pixel value of the neighborhood pixels along the straight line. Reference is made to Anil K. Jain, *Fundamentals of Digital Image Processing*, published by Prentice-Hall, Inc., 1989, page 362, which is incorporated herein by reference.

(c) Using an image subtraction technique to enhance abnormality-to-background contrast. The image subtraction method subtracts a nodule-suppressed image (e.g., a kernel size of 9 mm for a median filter) from a nodule-enhanced image (e.g., a matched filter of a sphere profile with 9 mm in diameter). The method is implemented by using two-dimensional spatial image convolution between a filter (match or median) and the image of the peripheral lung edge zone. In the spatial convolution using the median filter, the center pixel in the window (i.e., 9 mm by 9 mm square) is replaced by the median of the pixels in the window. In the spatial convolution using the matched filter, the center pixel in the window (again, a 9 mm by 9 mm square) is obtained by convolving the matched filter with the image pixels in the zone. Reference is made to Anil K. Jain, *Fundamentals of Digital Image Processing*, published by Prentice-Hall, Inc., 1989, page 403, which is incorporated herein by reference.

4. Zone IV—The peripheral central zone is enhanced by using an image subtracting method three times (with three sets of median and matched filters) to enhance the abnormality-to-background contrast in the peripheral central zone. Three subtracted images are generated by the three sets of median and matched filters. One set of median and matched filters has sizes of 21 mm and 21 mm in diameter, respectively, one set of median and matched filters has sizes of 15 mm and 15 mm in diameter, respectively, while the third set has sizes of 7 mm and 7 mm for the median and matched filters, respectively.

5. Zone V—The hilum zone is enhanced by using an image subtracting method twice (i.e., with two sets of median and matched filters) to enhance the abnormality-to-background contrast in the hilum zone. Two subtracted images are generated by the two sets of median and matched filters. One set of median and matched filters has sizes of 15 mm and 15 mm in diameter, respectively, while the other set has sizes of 9 mm and 9 mm for the median and matched filters, respectively.

6. Zone VI—The diaphragm zone is enhanced by an inverse contrast ratio mapping technique. The transform generates an image where the weak (i.e., low contrast) edges are enhanced. The transform is defined by the following equations:

$$\mu(m, n) = \frac{1}{N_w} \sum_{(k,l) \in W} \sum u(m-k, n-l)$$

$$\sigma(m, n) = \left\{ \frac{1}{N_w} \sum_{(k,l) \in W} \sum [u(m-k, n-l) - \mu(m, n)]^2 \right\}^{1/2}$$

where u(m,n) represents the pixel value at coordinates (m,n), and $\mu(m,n)$ and $\sigma(m,n)$ are the local mean and standard deviation of u(m,n) measured over a window W The output image v(m,n) is obtained as $$v(m, n) = \frac{u(m, n)}{\sigma(m, n)}$$

Reference is made to Anil K. Jain, *Fundamentals of Digital Image Processing*, published by Prentice-Hall, Inc., 1989, page 252, which is incorporated herein by reference.

Zone-Based Suspect Selection Unit (300)

Figure 5:
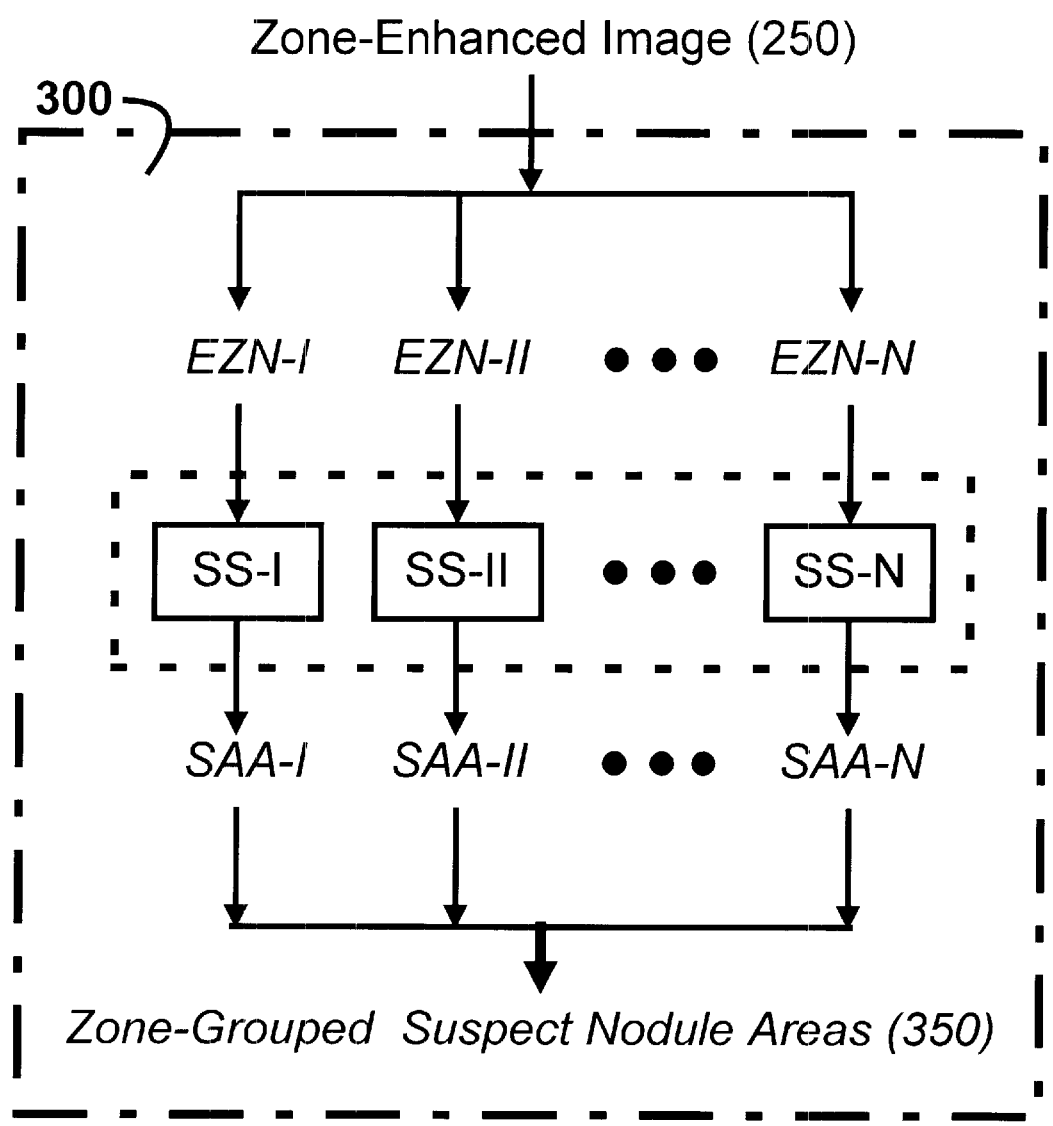
FIG. 5 is a schematic diagram of a zone-based suspected abnormality areas selection unit according to an embodiment of the present invention.

FIG. 5 depicts an embodiment of the zone-based suspect selection unit 300 of the image processing unit 40 illustrated in FIG. 2. In FIG. 5, SS-x represents suspect selection algorithm(s) used for zone x and SAA-x represents suspected abnormality areas in zone x, where x is I, II, III, IV, V, or VI.

Suspect selection unit 300 is used to detect round or nearly round objects in each enhanced zone. This processing stage is primarily based on gray-level contour search and sphere profile matching techniques (Lo, et. al., "Automatic Lung Nodule Detection Using Profile Matching and Back-Propagation Neural Network Techniques", 1993). Gray-value contour searching is performed to track the gray value edges of a closed boundary. The enclosed area examined by the contour search consists of a suspected abnormality area of a given size, like a 64×64 pixels image block. The image block is first processed via a background correction process, which fits the image block with a two-dimensional second order polynomial function. Each image block is processed with this background correcting process. A sphere profile matching technique is then used to compute the matching scores between the background-corrected image block of each suspected abnormality area and a set of two-dimensional synthetic sphere profiles of various diameters, such as 9 mm, 13 mm, 17 mm, 21 mm, 25 mm, and 29 mm.

Each profile has a third dimension representing normalized intensity. The sphere profiles are pre-calculated and stored in the memory unit (Memory Unit 30 in FIG. 1). The higher the values of the matching score, the higher the probability that a suspected area contains an abnormality. The method for detecting suspected abnormality areas in each zone is described as follows.

Step 1: Search for pixel values greater than the highest threshold value in the zone.

To determine the threshold values in each zone, first, a cumulative distribution function (CDF) is generated for each zone of the zone-enhanced image 250 in FIG. 2. For each CDF, ten different code values for each zone are selected based on their corresponding probabilities in the CDF of the zone (typically, code values correspond to 95%, 90%, 85%, etc. of CDFs) as the ten threshold values for each zone.

Step 2: Trace the boundary of an area containing pixel values greater than the threshold value.

A contour following algorithm is used to trace the boundary of an area where the edge has pixel values greater than the threshold value. Reference is made to Anil K. Jain, *Fundamentals of Digital Image Processing*, published by Prentice-Hall, Inc., 1989, page 358, which is incorporated herein by reference.

Step 3: Find the centroid (or center-of-mass) location of the area.

Step 4: Compute the area and the effective radius of the area.

The bit quads method is used to compute the size or area ($A_0$) and perimeter ($P_0$) of the area. Reference is made to Pratt, W. K., *Digital Image Processing*, Second Edition, published by John Wiley & Sons, Inc., 1991, pages 632–634, which is incorporated herein by reference. The effective radius ($R_e$) is then computed by $$R_e = \frac{P_0}{2\pi}$$

Step 5: Make (or retrieve from memory) a two-dimensional synthetic sphere profile having an equivalent radius to the effective radius, i.e., $R_e$.

Step 6: Calculate the matching score between the synthetic sphere profile and the suspected abnormality area. The matching score (M) is computed as $$M = \frac{\sum A(x, y) S(x, y)}{[\sum A^2(x, y)]^{1/2} [\sum S^2(x, y)]^{1/2}}$$

where S(x,y) is the synthetic nodule block and A(x,y) is the background subtracted image block, which is given by:

$$A(x, y) = f'(x, y) - B$$

where f'(x,y) denotes the background corrected image block and B is the calculated background value.

Step 7: Exclude the area as a potential suspect if the area has effective radius $R_e$ larger than the size (such as 20 mm) or $R_e$ smaller than the size (such as 8 mm) of the abnormality.

Step 8: Find the most probable case of matching by choosing the greatest match.

Step 9: Mask the area with a value below the threshold value, like 0.

Step 10: Go back to Step 1 and use the next highest threshold value; repeat until all threshold values have been used.

Different sets of two-dimensional sphere profiles are used in each individual zone to compute the matching score. For example, sphere profiles with small diameters of 9 mm, 13 mm, and 17 mm may be used in Zone I, and sphere profiles with large diameters of 21 mm, 25 mm, and 29 mm may be used in Zone V. Through the enhancing and matching processes, most of the round or nearly round objects are selected. The selected suspects are grouped together based on each suspect's location and the zone to which it belongs. The matching score threshold for selecting the suspects is set to different values for different zones. For example, Zones I and VI have high matching score thresholds while Zone II and III have low matching score thresholds.

Zone-Based Suspect Feature Extraction Unit (400)

Figure 6:
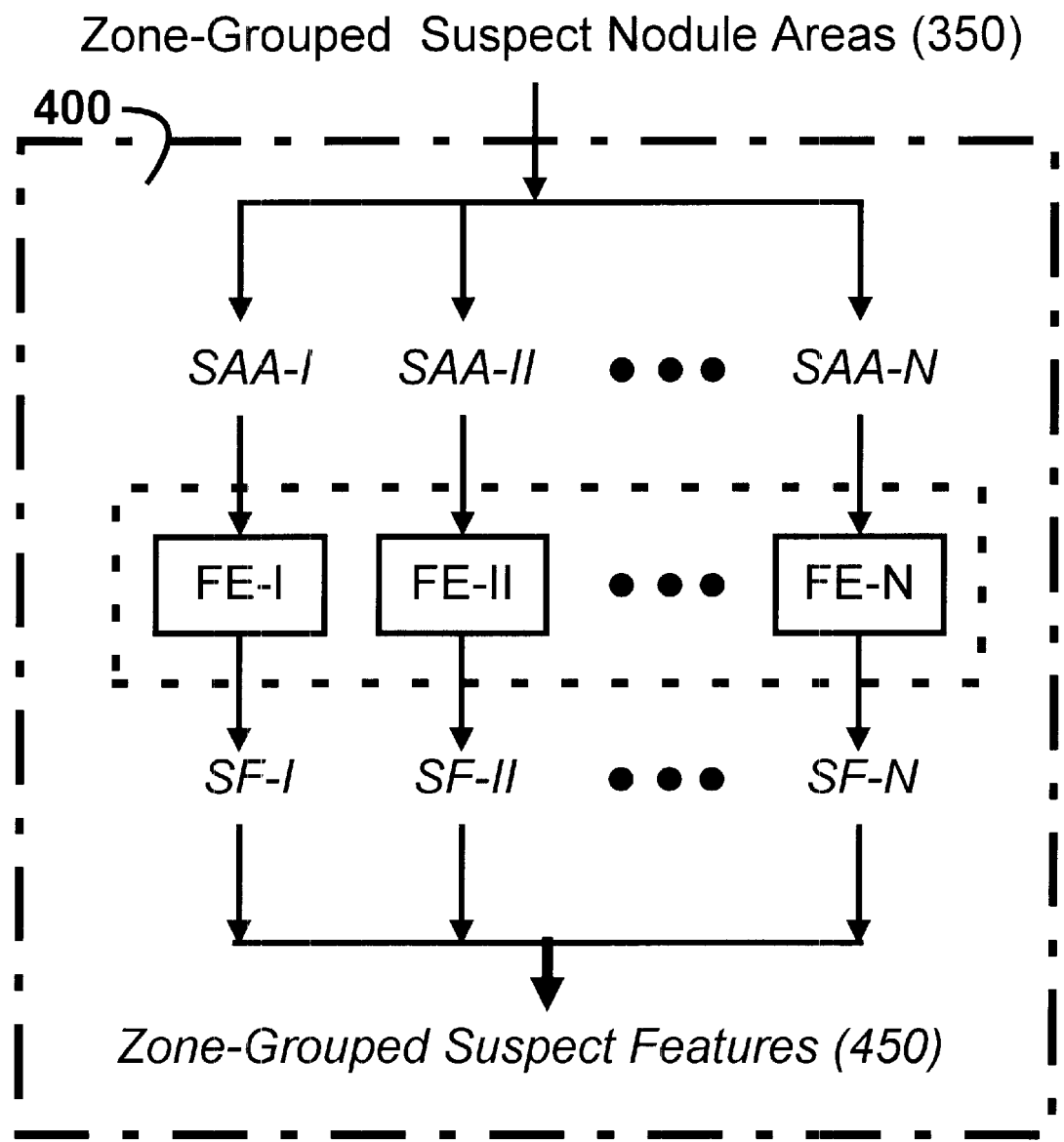
FIG. 6 is a schematic diagram of a zone-based feature extraction unit is according to an embodiment of the present invention.

FIG. 6 depicts an embodiment of the suspect feature extraction unit 400 of the image processing unit 40 illustrated in FIG. 2. In FIG. 6, FE-x represents feature extraction algorithm(s) used for zone x and SF-x represents suspect features of the SAA in zone x, where x is I, II, III, IV, V, or VI.

Based on the image characteristics of the abnormalities and the normal lung anatomic structure, the following methods are used to extract image features from the image blocks of the suspected abnormality areas (SAAs).

1. Zone I—Features, such as size, circularity, and elongation (or eccentricity), are extracted from each SAA. The size feature can be obtained by the bit quads method as described in Step 4 of the zone-based suspect selection unit 300. The circularity ($C_0$) feature is defined as $$C_0 = \frac{4\pi A_0}{(P_0)^2}$$

The elongation ($E_0$) is defined as $$E_0 = \frac{R_{max}}{R_{min}}$$

where $R_{min}$ and $R_{max}$ are the minimum and maximum distances, respectively, to the boundary from the center of the mass (described in step 3 of the zone-based suspect selection unit 300).

2. Zone II—Gradient features, like amplitude and orientation edge maps, are extracted from each SAA. The background corrected image is then processed with an edge operation, like a 3×3 Sobel edge operator, to obtain two edge maps: amplitude and orientation. The orientation angles are within the range between 0 and 360 degrees, whereas the amplitude varies from 0 to the maximum gray level value, for example, 1023. A two-dimensional histogram for both amplitude and orientation is then generated in a step of histogram generation processing; note that different anatomic structures reveal clearly different behaviors in the two-dimensional histogram. It is found that for true nodules the distribution of orientation angles is relatively uniform compared with false positive cases and that the magnitude of gradient amplitude of true nodules is mostly concentrated in the smaller magnitudes. Most types of false positive nodules demonstrate two peaks separated at around 180 degrees in the orientation angle axis, except for vessel clusters. Because bone is wider than vessels in the image block and the contrast between bone and the anatomic background is stronger than that for vessels, one peak in the distribution of orientation is typically smaller than another one for bone, whereas they are within a similar range for vessels.

Each peak in bone gradient images is sharper (i.e., smaller standard deviation) than those in vessel images. Rib-edge gradient images show one stronger amplitude distribution at a certain angle because of the orientation of the rib in the image block. The gradient distribution for rib-vessel crossings also demonstrates one stronger peak with relatively larger standard deviation in the orientation axis. In other words, the orientation information is more dominant than amplitude information for this category. Although one expects to obtain one sharper peak in the angle axis, it turns out to be a very insignificant effect due to the low contrast of end vessels. Vessel-cluster gradient images show rougher contours (i.e., larger standard deviation along the amplitude axis) than those of nodules. This type of analysis and classification algorithm performs well in noisy conditions because the distribution enhancement tends to smooth out the noise contribution to the feature vector. By integrating the two-dimensional histogram with respect to amplitude and orientation in the marginal distribution generation process, two sets of marginal distribution curves are obtained: one for orientation distribution and another one for amplitude distribution, each of which contains 64 elements (i.e., bins). Reference is made to U.S. patent application Ser. No. 08/597,736 submitted by M. Yeh, et. al., "Method and System for the Detection of Lung Nodule in Radiographical Images Using Digital Image Processing and Artificial Neural Network", which is incorporated herein by reference.

3. Zone III—Circularity (see the definition of $C_0$ in Zone I), area (see the definition of $A_0$ in Zone I), and moment invariants are image block features computed for each suspected abnormality area. Moment invariants features are extracted from each suspected abnormality area. Moment invariants are useful features because they are invariant under linear coordinate transformations, such as translation, scaling, rotation, and reflection. The moments are used as features for an image. Given the two-dimensional image intensity distribution $f(x,y)$, the $(p+q)$th-order moment $(m_{p,q})$ is defined as $$m_{p,q} = \int\int_R f(x, y) x^p y^q \, dx \, dy$$

$$p, q = 0, 1, 2, \ldots$$

The seven moment invariants are defined as follows:

(a) First order moments, $\mu_{0,1}$ and $\mu_{1,0}$ where $\mu_{p,q}$ is defined as where $$\mu_{p,q} = \int\int (x - \bar{x})^p (y - \bar{y})^q f(x, y) \, dx \, dy$$

$$\bar{x} \equiv \frac{m_{1,0}}{m_{0,0}}$$

$$\bar{y} \equiv \frac{m_{0,1}}{m_{0,0}}$$

(b) Second order moments (p+q=2)

$$\phi_1 = \mu_{2,0} + \mu_{0,2} \quad \phi_2 = (\mu_{2,0} - \mu_{0,2})^2 + 4\mu^2_{1,1}$$

(c) Third-order moments (p+q=3)

$$\phi_3 = (\mu_{3,0} - 3\mu_{1,2})^2 + (\mu_{0,3} - 3\mu_{2,1})^2$$

$$\phi_4 = (\mu_{3,0} + \mu_{1,2})^2 + (\mu_{0,3} + \mu_{2,1})^2$$

-continued $$\phi_5 = (\mu_{3,0} - 3\mu_{1,2})(\mu_{3,0} + \mu_{1,2})[(\mu_{3,0} + \mu_{1,2})^2 - 3(\mu_{2,1} + \mu_{0,3})^2]$$

$$\phi_6 = (\mu_{2,0} - \mu_{0,2})[(\mu_{3,0} + \mu_{1,2})^2 - (\mu_{2,1} + \mu_{0,3})^2] +$$
$$4\mu_{1,1}(\mu_{3,0} + \mu_{1,2})(\mu_{0,3} + \mu_{2,1}) +$$
$$(\mu_{0,3} - 3\mu_{2,1})(\mu_{0,3} + \mu_{2,1})[(\mu_{0,3} + \mu_{2,1})^2 - 3(\mu_{1,2} + \mu_{3,0})^2]$$

$$\phi_7 = (3\mu_{2,1} - \mu_{0,3})(\mu_{3,0} + \mu_{1,2})[(\mu_{3,0} + \mu_{1,2})^2 - 3(\mu_{2,1} + \mu_{0,3})^2] -$$
$$(\mu_{3,0} - 3\mu_{1,2})(\mu_{2,1} + \mu_{0,3})[3(\mu_{3,0} + \mu_{1,2})^2 - (\mu_{2,1} + \mu_{0,3})^2]$$

Reference is made to Anil K. Jain, *Fundamentals of Digital Image Processing*, published by Prentice-Hall, Inc., 1989, page 380, which is incorporated herein by reference.

4. Zone IV—Circularity (see the definition of $C_0$ in Zone I), size (see the definition of $A_0$ in Zone I), and amplitude and orientation of the Sobel gradient edge maps (see the description in Zone II) are the features extracted from each suspected abnormality area in Zone IV.

5. Zone V—Normalized image pixels of the suspected abnormality areas (e.g., 64×64 pixels image block) are used as the features to train a convolution neural network (to be described below in connection with the zone-based classification unit 500). The normalization is done by first computing the average pixel value ($\mu_0$) of the 8-connected pixels around the center pixel. Each pixel value (x) in the image block is mapped to a new pixel value (x*) by the following equation $$x^* = \frac{1}{1 + e^{-\beta(x-\mu_0)}}$$

where $\beta$ is a decaying control parameter and is set to 100.

6. Zone VI—Circularity (see the definition of $C_0$ in Zone I) and size (see the definition of $A_0$ in Zone I) are extracted as the features for the suspected abnormality areas in this zone.

Zone-Based Classification Unit (500)

Figure 7:
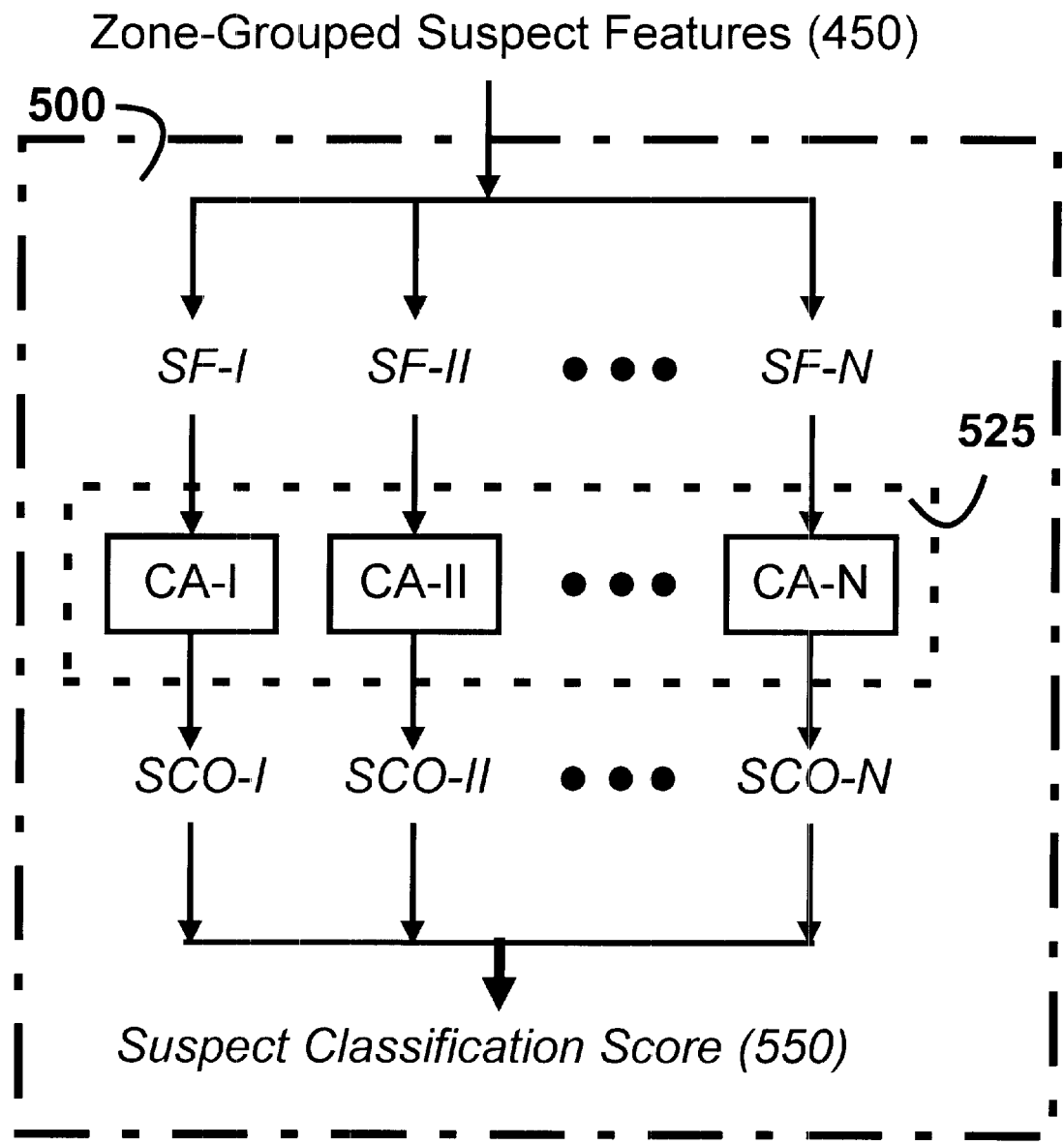
FIG. 7 is a schematic diagram of a zone-based classification unit according to an embodiment of the present invention.

FIG. 7 depicts an embodiment of the zone-based classification unit 500 of the image processing unit 40 illustrated in FIG. 2. In FIG. 7, CA-x represents classification method (s) used for zone x and SCO-x represents classifier score for the SAA in zone x, where x is I, II, III, IV, V, or VI.

In the final digital imaging stage, the classification stage, the data is first analyzed using background correction, followed by an edge operation, histogram generation, marginal distribution generation, standardization, and neural network classification and integration.

1. Zone I—In a preferred embodiment, self-organization feature maps (or learning vector quantization) are used to classify the suspected abnormality areas into two classes: one class representing the abnormality and the other representing false positives. The features of size, circularity, and elongation are used as the inputs to the self-organization feature map. For further reference about self-organizing feature maps, see Simon Haykin, *Neural Networks: A Comprehensive Foundation*, published by Macmillan College Publishing Company, Inc., 1994, page 408–412, which is incorporated herein by reference. The feature map is configured to have one input node and two output nodes. The input data to the input node is the gray value of each pixel. One output node corresponds to the true positive class (i.e., abnormality) while the other output node corresponds to the false positive class (i.e., non-abnormality including normal lung structure).

Euclidean distance is used as the matching criterion to find the best match in the self-organization learning process.

2. Zone II—Amplitude and orientation edge maps are used to train a supervised back-propagation neural network (BP ANN) to classify the abnormalities and the false positives. In a preferred embodiment, the back propagation neural network contains four processing layers. The input layer consists of 64 neurons corresponding to a combination of both amplitude and orientation bins of the marginal distributions (i.e., based on the two-dimensional histograms described above). Each set of neurons (amplitude and orientation bins) in the input layer perform a computation based on each individual feature set. Hence, each set of neurons works as an individual classifier. Two hidden layers contain, for example, 128 and 64 neurons, which are chosen as multiples of eight, since the properties of each class are desired to be coded evenly within the network. Finally a two-neuron output layer is used to classify either TRUE positive or FALSE positive nodules. A sigmoidal transfer function, varying from −1 to +1, is used as an activation function in each neuron. Furthermore, a two hidden-layer BP ANN with sigmoidal nonlinearities has been demonstrated theoretically and experimentally to classify any shape of decision regions and to approximate complex nonlinear functions. The data set of image blocks containing the true abnormalities and normal lung structures in this zone are first separated into a training set and a test set. The BP ANN learns from the training set presented to it during a learning phase (weight adaptation) until most of the training cases are learned properly. The trained network is then applied to the test data set. Approximately 50% of the data set is used as training examples, and the rest of them are used as test set. Because the BP ANN learns from the training data set presented to it during the learning phase (weight adaptation phase), the training samples need to be distributed equally among classes. By so doing, the BP ANN will not be biased toward any particular result class (in this case, TRUE nodule class and FALSE nodule class). In a preferred training embodiment, the TRUE nodule sample was replicated several times, and FALSE nodule samples were duplicated based upon the statistical properties of the training set such that there were similar amounts of TRUE and FALSE positive samples in the training sample set.

The training process is stopped when the learning achieves the maximum SUB-$A_z$ (read as SUB-A-SUB-Z) area under the receiver operating characteristic (ROC) curve. This method is called the cross-validated by SUB-$A_z$ (read as SUB-A-SUB-Z) or partial ROC area index. Cross-validation is a widely used method to determine the stopping point of a training process (i.e., training is stopped when the "best" set of weights are obtained during the learning process). In cross-validation, the data set is randomly divided into two sets, one training set and one testing set. The training set is further divided into two subsets: (a) a subset used for training the classifier and (b) a subset for evaluation of the performance of the trained classifier (i.e., validation of generalization performance); the valuation subset is typically ten to twenty percent of the training set. Reference is made to Simon Haykin, *Neural Network: A Comprehensive Foundation*, published by Macmillan College Publishing Company, Inc., 1994, pages 179–181, which is incorporated herein by reference. Normally, the cross-validation is done by finding the minimum mean-square error (on the cross-validation subset) on the cross-validation generalization curve at every training epoch. In a preferred embodiment, the SUB-$A_z$ is used to cross-validate the training process, and the training is stopped when the SUB-$A_z$ achieves a maximum.

ROC analysis is a widely used method of evaluating diagnostic performance. It provides a description of trade-offs between sensitivity and specificity. The area under the ROC curve (i.e., $A_z$) is normally used as the performance index described by an entire ROC curve. Reference is made to Yulei Jiang, et. al., "A Receiver Operating Characteristic Partial Area Index for Highly Sensitive Diagnostic Test", *Radiology*, Vol. 201, No. 3, 1996, pages 745–750, which is incorporated herein by reference. We monitor the change of the high specificity SUB-$A_z$ area through the whole training and validation process. Training is stopped when the SUB-$A_z$ area (in the high specificity region) achieves a maximum value. After training of the neural network is complete, entire data sets are then applied to the network to generate output values ranging from −1 to +1 at each neuron, representing the possibility of the occurrence of TRUE or FALSE nodules.

3. Zone III—We use the circularity, size, and moment invariants (the seven second- and third-order moments discussed above) features to train an error back-propagation neural network. The back propagation neural network contains four processing layers. The input layer consists of nine neurons corresponding to combination circularity, size, and seven moment invariants. Two hidden layers contain, for example, 36 and 18 neurons, respectively. Finally a one-neuron output layer is used to classify either TRUE positive or FALSE positive (abnormality). A sigmoidal transfer function, varying from −1 to +1, is used as an activation function in each neuron. As discussed above, a two hidden-layer BP ANN with sigmoidal nonlinearities has been demonstrated theoretically and experimentally to classify any shape of decision regions and to approximate complex nonlinear functions. The data set of image blocks of suspected abnormality areas is first separated into a training set and a test set. The BP ANN learns from the training set presented to it during a learning phase (weight adaptation) until most of the training cases are learned properly (this is the so called back-propagation learning algorithm). The trained network is then applied to the test data set. Approximately 50% of the data set is used as training examples, and the rest is used as the test set. Since the BP ANN learns from the training data set presented to it during the learning phase (weight adaptation phase), the training samples need to be distributed equally among classes. By so doing, the BP ANN will not be biased toward any result class(es) (in this case, TRUE nodule class and FALSE nodule class). In one example, a TRUE nodule sample was replicated several times, and FALSE nodule samples were duplicated based upon the statistical properties of the training set such that similar amounts of TRUE and FALSE positive samples were present in the training sample set. The training process is cross-validated such that the learning is stopped when the SUB-$A_z$ area in the high specificity region achieves a maximum. After training of the neural network is complete, entire data sets are then applied to the network to generate output values ranging from −1 to +1 at each neuron, representing the possibility of the occurrence of TRUE or FALSE nodules.

4. Zone IV—The features of circularity, size, and amplitude and orientation information are used as the input features to train a supervised back-propagation neural network.

The back propagation neural network contains four processing layers. The input layer consists of 66 neurons corresponding to a combination of circularity, size, and both amplitude and orientation bins of the marginal distributions. Each two sets of (amplitude and orientation bins) neurons in the input layer perform the computation based on each individual feature set. Hence, each set of neurons works as an individual classifier. Two hidden layers contain, for example, 132 and 66 neurons. Finally a two-neuron output layer is used to classify either TRUE positive or FALSE positive nodules. A sigmoid transfer function, varying from −1 to +1, is used as an activation function in each neuron. The data set of image blocks in this zone is first separated into a training set and a test set. The classifier is trained by the back-propagation learning algorithm. Approximately 40% of the data set is typically used as training examples, and the rest are used as the test set. Since a BP ANN learns from the training data set presented to it during the learning phase (weight adaptation phase), the training samples need to be distributed equally among classes. By so doing, the BP ANN will not be biased toward any result class(es) (in this case, TRUE nodule class and FALSE nodule class). In one example, a TRUE nodule sample was replicated several times, and FALSE nodule samples were duplicated based upon the statistical properties of the training set such that similar amounts of TRUE and FALSE positive samples were in the training sample set. The neural network is trained and cross-validated to have high specificity by using the SUB-$A_z$ method (see the description in Zone III). After training of the neural network is complete, entire data sets are then applied to the network to generate output values ranging from −1 to +1 at each neuron, representing the possibility of the occurrence of TRUE or FALSE nodules. Reference is made to U.S. patent application Ser. No. 08/597,736 submitted by M. Yeh, et. al., "Method and System for the Detection of Lung Nodule in Radiographical Images Using Digital Image Processing and Artificial Neural Network", which is incorporated herein by reference.

5. Zone V—The normalized image pixels of the suspected abnormality areas are used to train a convolution neural network. The convolution neural network has one input layer, one hidden layer, and one output layer. The input layer consists of the pixels of the normalized image block (64×64 pixels), and the output layer consists of one output neuron. The hidden layer is composed of 10 groups of 60 by 60 neurons arranged as n independent 60 by 60 feature maps, where 60 is equal to 64−5+1 and the convolution kernel corresponds to a 5×5 area. Each hidden neuron in the feature map in the hidden layer takes input on a 5×5 neighborhood of the input image block. For neurons in the same feature map that are one neuron apart, their receptive fields in the input layer are one pixel apart. Each neuron in the same feature map is constrained to have the same set of 25 weights and to perform the same operation on the corresponding part of the input image. The convolution neural network is trained by using the back-propagation learning algorithm and is cross validated by the SUB-$A_z$ method (see the description in Zone III). The convolution neural network is trained to have high specificity. Reference is made to Jyh-Shyan Lin, et. al., "Differentiation Between Nodules and End-On Vessels Using a Convolution Neural Network Architecture", *Journal of Digital Imaging*, Vol. 8, No. 3, 1995, page 132–141, which is incorporated herein by reference.

6. Zone VI—Rule-based classification is used to classify the suspected abnormality areas based on their circularity (see the definition of $C_0$ in zone I in Zone-Based Suspect Feature Extraction Unit 400) and effective radius (see $R_e$ in step 4 in the Zone-Based Suspect Selection Unit 300) features. The distribution of the circularity and size is analyzed for abnormalities and false positives. A threshold is selected for each of the circularity and the size. The rules used to select a potential abnormality, e.g., nodule, are as follows:
   (a) Use a different threshold for each different zone. The threshold value is determined based on the sensitivity and specificity performance of each zone-specific classifier.
   (b) If the circularity is smaller than 0.8, then the suspected abnormality area is not selected as a suspect.
   (c) If the size is larger than 30 mm in diameter, then the suspected abnormality area is not selected as a suspect.
   (d) If the circularity is greater than or equal to 0.8 and the size is smaller than 30 mm in diameter, then the suspected abnormality area is selected as a suspect.
   (e) The size * circularity is used as the classification score for the suspected abnormality area.

Figure 8:
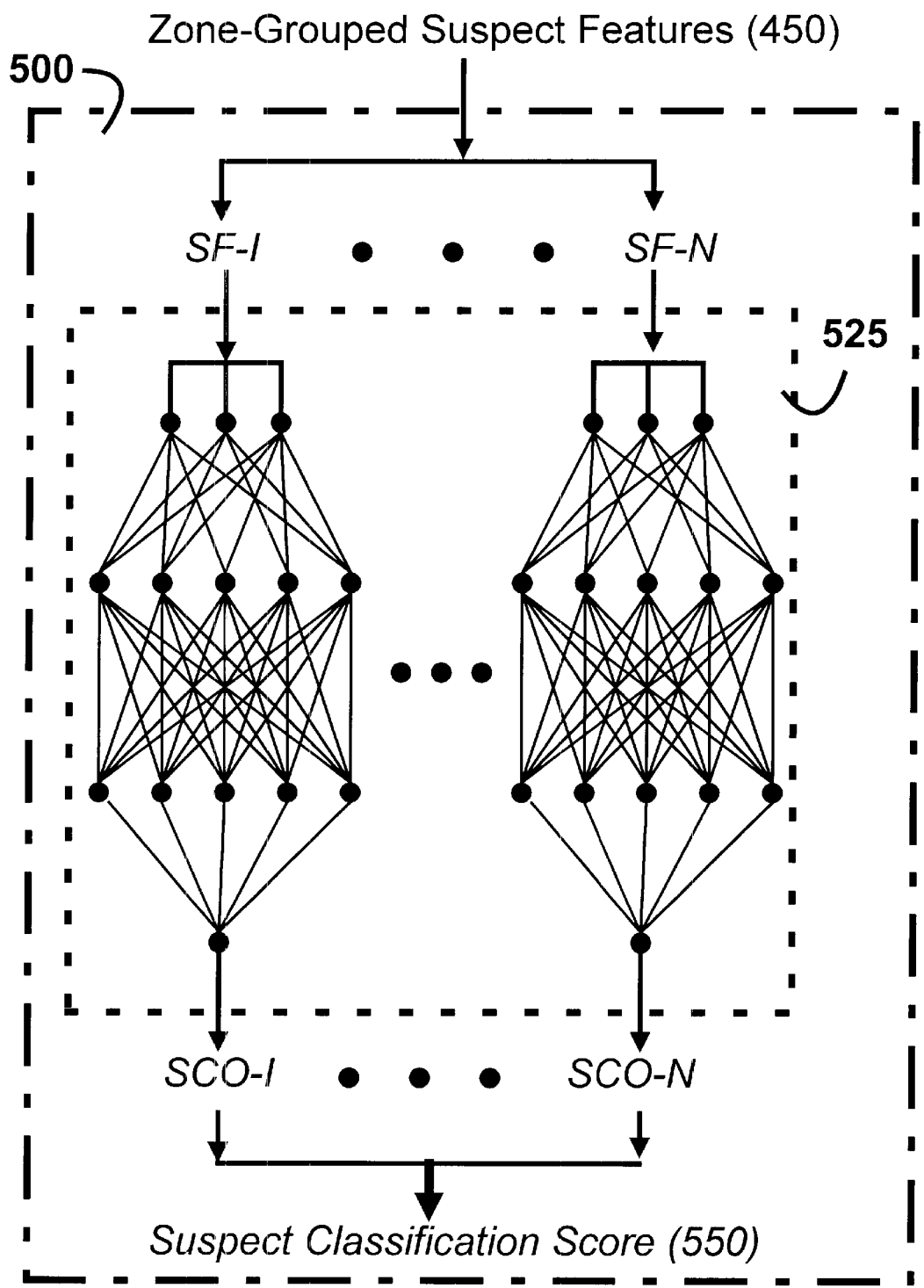
FIG. 8 demonstrates the architecture of a back-propagation trained feed-forward neural network classifier used in the automated method and system according to an embodiment of the present invention.

FIG. 8 depicts an embodiment of the system shown in FIG. 7, showing detail of some of the internal structures within the parallel processing structure 525.

Zone-Based Data Fusion Unit (600)

Figure 9:
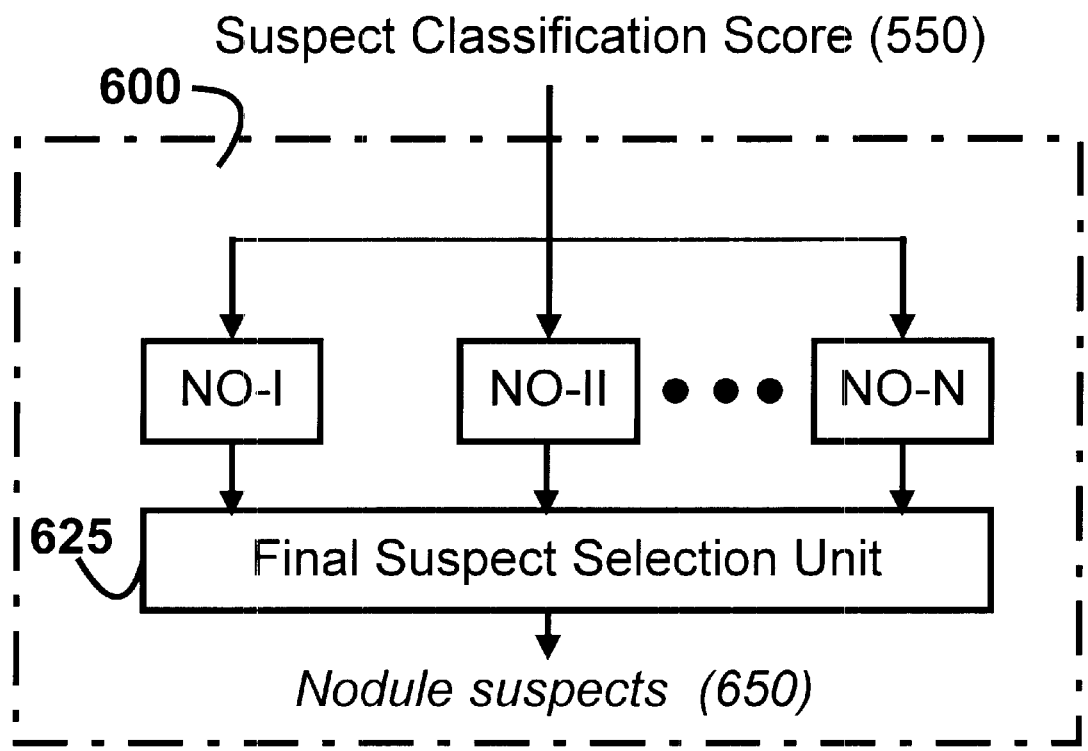
FIG. 9 is a representation of a zone data fusion unit that combines suspect classification scores from different zone classifiers according to an embodiment of the present invention.

FIG. 9 depicts an embodiment of the zone-based data fusion unit 600 of the image processing unit 40 illustrated in FIG. 2.

The suspect classification scores 550 generated by different classifiers of different zones are normalized by the zone-based score normalization units indicated as NO-I, NO-II, etc. The classification score for each suspect in the same zone is normalized by the maximum score in that zone. The normalization process is shown as follows:

$$NS_i^M = \frac{S_i^M}{\text{MAX}_{\forall i=1,\ldots,N}\{S_i^M\}}$$

where $S_i$ is the classification score for the ith suspect in zone M, subscript i indicate the ith suspect, and MAX{.} is the maximum value in the set.

The normalized scores for the suspects of different zones are fed into a final suspect selection unit 625. Based on the normalized score, the final suspect selection unit 625 selects the suspects as the final suspects using the following rules:
(a) Select only the suspects that have normalized suspect classification score larger than a preset threshold, e.g., 0.5.
(b) The number of final suspects is limited (for example, to six suspects from each image).
(c) If there is more than one suspect having a normalized score greater than the threshold in each zone, then select at most one (i.e., the suspect which has the highest score) from each zone.
(d) Select the six suspects having the highest scores as the final suspects.

Parallel Processing Engine

Figure 10:
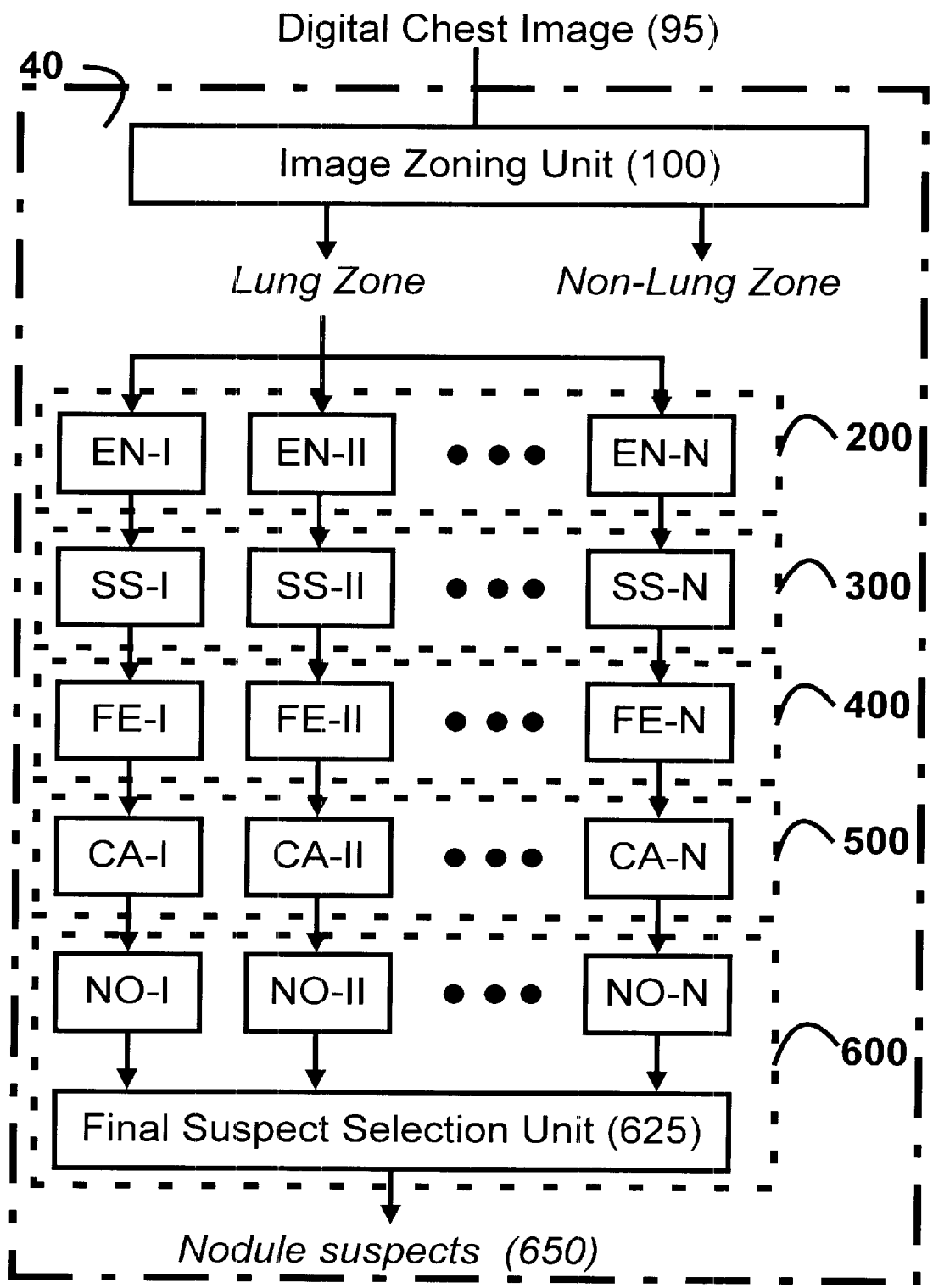
FIG. 10 is a representation of the architecture of a parallel processing engine that processes each zone in parallel according to an embodiment of the present invention.

FIG. 10 illustrates a schematic diagram of an embodiment of a parallel processing implementation of the image processing unit 40 illustrated in FIG. 2.

The automated system and method for lung nodule detection has been implemented in a multiple processor environment. The divide-and-conquer method can be implemented in pipelining form or in parallel based on the processing speed and throughput of each processor. For example, one processor may be processing Zone I while the other processing elements are processing other zones. The results from different zones will be combined based on throughput of each processing element.

It should be understood that the methods and systems described herein may be modified within the scope of the invention. For example, while the inventive methods and systems are described herein in connection with the detection of lung nodules, it should be clear that these methods and systems may be used for detecting other types of cancer such as microcalcification clusters or masses in breast cancer, nodules, lumps, irregularities, or tumors in other body parts. It can also be used for other modalities, for example, detection of abnormalities, like lung nodules, in computer tomography (CT).

We claim:

1. A method of identifying abnormalities in radiological images of the chest, the method comprising the steps of:
   receiving a digital chest image;
   discarding pixels outside of the lung zone;
   dividing the lung zone into different overlapped zones based on the geometry and subtlety distribution and image characteristics of abnormalities and normal anatomic structure in each zone;
   enhancing abnormality signals by using enhancement techniques specifically developed for each zone;
   preliminarily selecting suspect abnormalities in each zone;
   extracting image features in each zone;
   classifying abnormalities and normal anatomic structures in each zone;
   integrating outputs from different zones; and
   providing an indication of abnormalities.

2. A method according to claim 1, wherein the step of dividing further comprises the steps of:
   extracting a non-obscured lung zone using a neural network; and
   obtaining an obscured lung zone by excluding from the lung zone the pixels of the image corresponding to the non-obscured lung zone.

3. A method according to claim 2, wherein said different overlapped zones comprise:
   a zone of obscured lung;
   a zone of clavicle;
   a zone of peripheral lung edge;
   a zone of peripheral lung central;
   a zone of hilum; and
   a zone of diaphragm.

4. A method according to claim 3, wherein said zone of obscured lung includes spine, heart, and mediastinum.

5. A method according to claim 3, wherein said zone of clavicle comprises an area extending from the tops of right and left portions of said non-obscured lung zone and covering a region comprising a predetermined portion of the vertical distance toward the bottoms of said right and left portions of said non-obscured lung zones.

6. A method according to claim 3, wherein said zone of peripheral lung edge is obtained by the step of:
   performing image processing methods including morphological processing with a structure element along the contour of the ribcage.

7. A method according to claim 6, wherein said morphological processing comprises erosion.

8. A method according to claim 3, wherein said zone of peripheral lung central is obtained by the step of:
   performing image processing methods including morphological processing with two structure elements along the contour of the ribcage.

9. A method according to claim 8, wherein said morphological processing comprises erosion.

10. A method according to claim 3, wherein said zone of hilum is obtained by the step of:
    performing image processing methods including morphological processing with two structure elements along the contour of the ribcage; and
    performing image processing methods including morphological processing with a structure element along the contour of the heart and spine.

11. A method according to claim 10, wherein at least one of said morphological processings comprises erosion.

12. A method according to claim 3, wherein said zone of the diaphragm is obtained by the step of:
    performing image processing methods including morphological processing with a structure element along the diaphragm.

13. A method according to claim 12, wherein said morphological processing comprises erosion.

14. A method according to claim 3, wherein said step of enhancing abnormality signals further comprises the step of:
    applying specific image enhancement methods tailored to each zone independently to suppress background structures and to further enhance abnormality-to-background contrast.

15. A method according to claim 14, wherein said image enhancement method tailored to said zone of obscured lung comprises the step of:
    using contrast enhancement methods, to obtain a more uniform histogram of the zone and enhance the contrast of obscured lung.

16. A method according to claim 14, wherein said image enhancement method tailored to said zone of clavicle comprises the steps of:
    performing edge detection methods; and
    using an edge removal method.

17. A method according to claim 16, wherein said edge detection methods include a Hough transform.

18. A method according to claim 14, wherein said image enhancement method tailored to said zone of peripheral lung comprises the step of:
    using edge detection and removal methods to suppress the ribcage structure.

19. A method according to claim 18, wherein said edge detection and removal methods include a Hough transform.

20. A method according to claim 14, wherein said image enhancement method tailored to said zone of peripheral lung central comprises the step of:
    performing image subtraction using median and matched filtering by spatially convolving the pixels of the zone with multiple sphere profiles of different size nodule images.

21. A method according to claim 14, wherein said image enhancement method tailored to said zone of hilum comprises the step of:
    performing image subtraction using median and matched filtering by spatially convolving the pixels of the zone with multiple synthetic nodule profiles of different sizes.

22. A method according to claim 14, wherein said image enhancement method tailored to said zone of diaphragm comprises the step of:
    increasing the abnormality-to-background contrast using an inverse contrast ratio mapping technique.

23. A method according to claim 3, wherein said step of preliminarily selecting suspect abnormality areas further comprises the steps of:

clustering the suspect abnormality areas into different groups; and using different threshold and sensitivity and specificity values in each different zone.

24. A method according to claim 23, wherein said step of preliminarily selecting suspect abnormality areas in said zone of obscured lung is performed with high specificity.

25. A method according to claim 23, wherein said step of preliminarily selecting suspect abnormality areas in said zone of clavicle is performed with high sensitivity.

26. A method according to claim 23, wherein said step of preliminarily selecting suspect abnormality areas in said zone of peripheral lung edge is performed with high sensitivity.

27. A method according to claim 23, wherein said step of preliminarily selecting suspect abnormality areas in said zone of peripheral lung central is performed with high sensitivity.

28. A method according to claim 23, wherein said step of preliminarily selecting suspect abnormality areas in said zone of hilum is performed with high specificity.

29. A method according to claim 23, wherein said step of preliminarily selecting suspect abnormality areas in said zone of diaphragm is performed with high specificity.

30. A method according to claim 3, wherein said step of classifying includes the steps of:

training specific classifiers using the selected suspects and abnormality in each zone to classify an abnormality and normal anatomic structures in each zone; and training at least one neural network by using cross-validation using SUB-$A_z$ techniques.

31. A method according to claim 30, wherein said step of classifying further comprises the step of, for said zone of obscured lung, using a back-propagation neural network.

32. A method according to claim 30, wherein said step of classifying further comprises the step of, for said zone of clavicle, comparing the density around the clavicle bone area of both the left and right lungs to detect abnormalities.

33. A method according to claim 30, wherein said step of classifying further comprises the step of, for said zone of peripheral lung edge, training a back-propagation neural network.

34. A method according to claim 30, wherein said step of classifying further comprises the step of, for said zone of peripheral lung central, training a back-propagation neural network using those of said selected suspects located in said zone of peripheral central.

35. A method according to claim 30, wherein said step of classifying further comprises the step of, for said zone of hilum, using a convolution neural network.

36. A method according to claim 30, wherein said step of classifying further comprises the step of, for said zone of diaphragm, thresholding a matching filter.

37. A method according to claim 30, wherein a desired performance of each of said zone-based classifiers is obtained by training each zone classifier to have sensitivity and specificity performance according to the particular zone.

38. A method according to claim 30, wherein said cross-validation using SUB-$A_z$ is used to cross-validate the classifier for each zone.

39. A method according to claim 1, wherein said step of integrating outputs comprises the step of combining the outputs from different zones based on the sensitivity and specificity performance for each zone in said step of classifying.

40. A method according to claim 1, further comprising the step of:

utilizing a parallel processing engine for processing each zone, said parallel processing engine processing each zone independently and in parallel.

41. A method according to claim 3, wherein said step of extracting image features in each zone comprises the step of, for the zone of obscured lung, extracting size, circularity and elongation for each suspected abnormality area in that zone.

42. A method according to claim 41, where said step of extracting size, circularity and elongation comprises the step of employing a bit quads method to extract size.

43. A method according to claim 3, wherein said step of extracting image features in each zone comprises the step of, for the zone of clavicle, extracting gradient features for each suspected abnormality area in that zone.

44. A method according to claim 43, where said gradient features include amplitude and orientation edge maps.

45. A method according to claim 3, wherein said step of extracting image features in each zone comprises the step of, for the zone of peripheral lung edge, extracting circularity, area and moment invariants for each suspected abnormality area in that zone.

46. A method according to claim 3, wherein said step of extracting image features in each zone comprises the step of, for the zone of peripheral lung central, extracting circularity, size and amplitude and orientation edge maps for each suspected abnormality area in that zone.

47. A method according to claim 3, wherein said step of extracting image features in each zone comprises the step of, for the zone of hilum, normalizing image pixels of each suspected abnormality area in that zone.

48. A method according to claim 47, wherein said step of normalizing image pixels comprises the steps of:

computing an average pixel value, $\mu_0$, of the 8-connected pixels surrounding each pixel of a suspected abnormality area; and for each pixel value x, mapping the pixel value to a new pixel value, x*, by using the equation, $$x^* = \frac{1}{1 + e^{-\beta(x-\mu_0)}}$$

where β is a decaying control parameter.

49. A method according to claim 3, wherein the step of extracting image features in each zone comprises, for the zone of diaphragm, extracting circularity and size for each suspected abnormality area in that zone.

50. A system for identifying abnormalities in radiological images of the chest, comprising:

(a) an image input unit, said image input unit receiving a digital chest image;

(b) a memory unit for storing at least one digital chest image;

(c) an image processing unit that detects said abnormalities, the image processing unit comprising:

an image zoning unit that divides said digital chest image into overlapped zones, thereby generating a zoned image;

a zone-based image enhancement unit that enhances each zone of said zoned image using an enhancement technique tailored to that zone, thereby generating a zone-enhanced image;

a zone-based suspect selection unit that processes each zone of said zone-enhanced image to extract zone-grouped suspect abnormality areas;

a zone-based feature extraction unit that processes said zone-grouped abnormality areas of each zone using a technique tailored to that particular zone, thereby generating zone-grouped suspect features;

a zone-based classification unit that uses different classifiers tailored to the different zones to process said zone-grouped suspect features and to thereby generate suspect classification scores corresponding to said zone-grouped suspect abnormality areas; and a zone-based data fusion unit that processes said suspect classification scores associated with said zone-grouped suspect abnormality areas to provide final abnormality areas; and (d) an image output unit.

51. A system according to claim 50, wherein at least one of said zone-based image enhancement unit, said zone-based suspect selection unit, said zone-based feature extraction unit, and said zone-based classification unit comprises components that implement parallel processing of the various zones.

52. A system according to claim 50, wherein said image zoning unit discards pixels of said digital chest image located outside the lung region; further divides the lung region into obscured and non-obscured lung zones; and sub-divides the non-obscured lung zone into further zones based on the geometry and subtlety distribution and image characteristics of abnormalities in each of the zones.

53. A system according to claim 52, wherein said further zones include the following: obscured lung, clavicle, peripheral lung edge, peripheral lung central, hilum, and diaphragm.

54. A system according to claim 53, wherein said obscured lung zone includes spine, heart, and mediastinum.

55. A system according to claim 53, wherein said clavicle zone comprises an area extending from the tops of right and left portions of said non-obscured lung zone and covering a region comprising a certain portion of the vertical distance toward the bottoms of said right and left portions of said non-obscured lung zones.

56. A system according to claim 53, wherein said image zoning unit obtains said peripheral lung edge zone by performing image processing methods including morphological processing with a structure element along the contour of the ribcage.

57. A system according to claim 56, wherein said morphological processing comprises erosion.

58. A system according to claim 53, wherein said image zoning unit obtains said peripheral lung central zone by performing image processing methods including morphological processing with two structure elements along the contour of the ribcage.

59. A system according to claim 58, wherein said morphological processing comprises erosion.

60. A system according to claim 53, wherein said image zoning unit obtains said hilum zone by performing image processing methods including morphological processing with two structure elements along the contour of the ribcage.

61. A system according to claim 60, wherein said morphological processing comprises erosion.

62. A system according to claim 53, wherein said image zoning unit obtains said diaphragm zone by performing image processing methods including morphological processing with a structure element along the diaphragm.

63. A system according to claim 62, wherein said morphological processing comprises erosion.

64. A system according to claim 53, wherein said zone-based image enhancement unit implements specific image enhancement methods tailored to each zone independently to suppress background structures and to further enhance abnormality-to-background contrast.

65. A system according to claim 64, wherein said zone-based image enhancement unit comprises zone-specific image enhancement units, each of which implements one of said image enhancement methods.

66. A system according to claim 64, wherein the image enhancement method tailored to said obscured lung zone uses contrast enhancement methods to obtain a more uniform histogram and enhance the contrast of the obscured lung zone.

67. A system according to claim 66, wherein said contrast enhancement methods include histogram equalization.

68. A system according to claim 64, wherein the image enhancement method tailored to said clavicle zone includes performing edge detection methods and using an edge removal technique.

69. A system according to claim 68, wherein said edge detection methods include a Hough transform.

70. A system according to claim 64, wherein the image enhancement method tailored to said peripheral lung zone uses edge detection and removal methods to suppress the ribcage structure.

71. A system according to claim 70, wherein said edge detection and removal methods include a Hough transform.

72. A system according to claim 64, wherein the image enhancement method tailored to said peripheral lung central zone performs median and matched filtering by spatially convolving the pixels of the zone with multiple synthetic sphere profiles of different sizes of nodule images.

73. A system according to claim 64, wherein the image enhancement method tailored to said hilum zone performs matched filtering by spatially convolving the pixels of the zone with multiple sizes of synthetic nodule profiles.

74. A system according to claim 64, wherein the image enhancement method tailored to said diaphragm zone increases the abnormality-to-background contrast using an inverse contrast ratio mapping technique.

75. A system according to claim 53, wherein said zone-based suspect selection unit clusters suspect abnormality areas into different groups and uses different threshold and sensitivity and specificity values in each different zone.

76. A system according to claim 75, wherein in said obscured lung zone high specificity is used.

77. A system according to claim 75, wherein in said clavicle zone high sensitivity is used.

78. A system according to claim 75, wherein in said peripheral lung edge zone high sensitivity is used.

79. A system according to claim 75, wherein in said peripheral lung central zone high sensitivity is used.

80. A system according to claim 75, wherein in said hilum zone high specificity is used.

81. A system according to claim 75, wherein in said diaphragm zone high specificity is used.

82. A system according to claim 53, said zone-based classification unit comprising specific classifiers corresponding to each of said zones, each of said classifiers being trained using selected suspect and abnormality data of a particular zone, to enable that classifier to classify an abnormality and normal anatomic structures in the particular zone; and wherein at least one of said specific classifiers comprises a neural network, said neural network being trained by using cross-validation using SUB-$A_z$ techniques.

83. A system according to claim 82, wherein the classifier corresponding to the obscured lung zone comprises a back-propagation neural network.

84. A system according to claim 82, wherein the classifier corresponding to the clavicle zone comprises means for comparing the density around the clavicle bone area of both the left and right lungs to detect abnormalities.

85. A system according to claim 82, wherein the classifier corresponding to the peripheral lung edge zone comprises a back-propagation neural network.

86. A system according to claim 82, wherein the classifier corresponding to the peripheral lung central zone comprises a back-propagation neural network.

87. A system according to claim 82, wherein the classifier corresponding to the hilum zone comprises a convolution neural network.

88. A system according to claim 82, wherein the classifier corresponding to the diaphragm zone thresholds a matching filter.

89. A system according to claim 82, wherein a desired performance of each of said classifiers is obtained by training each classifier to have a sensitivity and specificity performance according to the particular zone.

90. A system according to claim 82, wherein cross-validation using SUB-$A_z$ is used to cross-validate the classifier for each zone.

91. A system according to claim 82, wherein said zone-based data fusion unit comprises means for combining the outputs from different zones based on sensitivity and specificity performance for each zone's classifier.

92. A system according to claim 50, said image processing unit comprising a parallel processing engine for processing each zone, said parallel processing engine processing each zone independently and in parallel.

93. A system according to claim 92, said parallel processing engine encompassing said zone-based image enhancement unit, said zone-based suspect selection unit, said zone-based feature extraction unit, and said zone-based classification unit.

94. A system according to claim 53, wherein said zone-based feature extraction unit comprises means, for the obscured lung zone, for extracting size, circularity and elongation for each suspected abnormality area in that zone.

95. A system according to claim 94, where said means for extracting size, circularity and elongation employs a bit quads method to extract size.

96. A system according to claim 53, wherein said zone-based feature extraction unit comprises means, for the clavicle zone, for extracting gradient features for each suspected abnormality area in that zone.

97. A system according to claim 96, where said gradient features include amplitude and orientation edge maps.

98. A system according to claim 53, wherein said zone-based feature extraction unit comprises means, for the peripheral lung edge zone, for extracting circularity, area and moment invariants for each suspected abnormality area in that zone.

99. A system according to claim 53, wherein said zone-based feature extraction unit comprises means, for the peripheral lung central zone, for extracting circularity, size and amplitude and orientation edge maps for each suspected abnormality area in that zone.

100. A system according to claim 53, wherein said zone-based feature extraction unit comprises means, for the hilum zone, for normalizing image pixels of each suspected abnormality area in that zone.

101. A system according to claim 100, wherein said means for normalizing image pixels comprises:

means for computing an average pixel value, $\mu_0$, of the 8-connected pixels surrounding each pixel of a suspected abnormality area and, for each pixel value x, for mapping the pixel value to a new pixel value, x*, by using the equation, $$x^* = \frac{1}{1 + e^{-\beta(x-\mu_0)}}$$

where $\beta$ is a decaying control parameter.

102. A system according to claim 53, wherein the zone-based feature extraction unit comprises, for the diaphragm zone, means for extracting circularity and size for each suspected abnormality area in that zone.

* * * * *